(12) United States Patent
Gresh et al.

(10) Patent No.: US 11,603,956 B2
(45) Date of Patent: Mar. 14, 2023

(54) PIPE ISOLATION DEVICE

(71) Applicant: Team Industrial Services, Inc., Sugar Land, TX (US)

(72) Inventors: Brian Michael Gresh, Broken Arrow, OK (US); David Warren Albertson, Collinsville, OK (US); Joaquin Reyes, Sand Springs, OK (US)

(73) Assignee: Team Industrial Services, Inc., Sugar Land, TX (US)

( * ) Notice: Subject to any disclaimer, the term of this patent is extended or adjusted under 35 U.S.C. 154(b) by 0 days.

(21) Appl. No.: 17/271,803

(22) PCT Filed: Aug. 29, 2019

(86) PCT No.: PCT/US2019/048828
§ 371 (c)(1),
(2) Date: Feb. 26, 2021

(87) PCT Pub. No.: WO2020/047265
PCT Pub. Date: Mar. 5, 2020

(65) Prior Publication Data
US 2021/0325004 A1    Oct. 21, 2021

Related U.S. Application Data

(60) Provisional application No. 62/724,819, filed on Aug. 30, 2018.

(51) Int. Cl.
*F16L 55/105* (2006.01)
*F17D 3/10* (2006.01)

(52) U.S. Cl.
CPC .............. *F16L 55/105* (2013.01); *F17D 3/10* (2013.01)

(58) Field of Classification Search
CPC ......... F17D 3/10; F16L 55/10; F16L 55/1018; F16L 55/105; F16L 55/11; F16L 55/12;
(Continued)

(56) References Cited

U.S. PATENT DOCUMENTS 2,177,916 A * 10/1939 Thomas ................ F16L 55/132
138/90
2,906,295 A     9/1959 Ver Nooy
(Continued)

FOREIGN PATENT DOCUMENTS

FR    2253973 A1    7/1975
GB     804790 A    11/1958
(Continued)

OTHER PUBLICATIONS

Office Action in related application SA 21771/206 dated Jun. 22, 2022.
(Continued)

*Primary Examiner* — Kenneth Rinehart
*Assistant Examiner* — Jonathan J Waddy
(74) *Attorney, Agent, or Firm* — Patterson + Sheridan, LLP

(57) ABSTRACT

A pipe isolation device and method of using the same. The pipe isolation device includes a control bar head, a first sealing head, and a second sealing head. The first sealing head has a first seal element and a first sliding engagement. The first sliding engagement permits the first sealing head to slide relative to the control bar head along a first fixed path and traverse a right angle to gain access to an interior space of a pipe. The second sealing head has a second seal element and a second sliding engagement. The second sliding engagement permits the second sliding head to slide relative (Continued)

to the first sealing head along a second fixed path and traverse the right angle to gain access to an interior space of the pipe.

13 Claims, 17 Drawing Sheets

(58) Field of Classification Search
CPC ... F16L 55/124; F16L 55/128; F16L 55/1283; F16L 55/132
USPC ......... 137/559, 614.18, 613, 614.11; 138/90, 138/92, 94
See application file for complete search history.

(56) References Cited

U.S. PATENT DOCUMENTS

| | | | | |
|---|---|---|---|---|
| 4,682,631 | A * | 7/1987 | Wilger | F16L 55/105 |
| | | | | 138/94 |
| 5,924,454 | A * | 7/1999 | Dyck | F16L 55/1283 |
| | | | | 138/90 |
| 7,766,047 | B1 | 8/2010 | Garrison et al. | |
| 7,841,364 | B2 | 11/2010 | Teazel et al. | |
| 7,849,882 | B1 | 12/2010 | Lee et al. | |
| 7,866,347 | B2 | 1/2011 | Bowie | |
| 8,047,219 | B2 | 11/2011 | Puckett et al. | |
| 8,267,124 | B2 * | 9/2012 | Bowie | F16L 55/136 |
| | | | | 138/98 |
| 8,307,856 | B2 | 11/2012 | Teazel et al. | |
| 9,897,240 | B2 * | 2/2018 | Kearns | F16L 55/105 |
| 10,989,347 | B2 * | 4/2021 | McKone | F16K 7/20 |
| 2006/0237060 | A1 * | 10/2006 | Calkins | F16L 55/124 |
| | | | | 137/15.14 |
| 2008/0017390 | A1 * | 1/2008 | Bowie | G01M 3/2853 |
| | | | | 166/387 |
| 2009/0114301 | A1 * | 5/2009 | Yeazel | F16L 55/132 |
| | | | | 138/90 |
| 2009/0114302 | A1 * | 5/2009 | Yeazel | F16L 55/124 |
| | | | | 138/90 |
| 2010/0229958 | A1 * | 9/2010 | Puckett | F16L 55/124 |
| | | | | 137/15.12 |
| 2022/0275899 | A1 * | 9/2022 | Evans | F16L 55/105 |

FOREIGN PATENT DOCUMENTS

| | | |
|---|---|---|
| KR | 101191394 B1 | 10/2012 |
| WO | 2002063196 A3 | 2/2003 |
| WO | 2020047265 A1 | 3/2020 |

OTHER PUBLICATIONS

International Search Report and Written Opinion in related application PCT/US2019/048828 dated Nov. 4, 2019.
Extended European Search Report in related application EP 19854892 dated Apr. 19, 2022.

* cited by examiner

PIPE ISOLATION DEVICE

CROSS-REFERENCE TO RELATED APPLICATIONS

This application is a National Phase filing under 35 U.S.C. § 371 of International Application PCT/US2019/048828, filed on Aug. 29, 2019, which claims priority to U.S. Provisional Application Ser. No. 62/724,819, filed Aug. 30, 2018, entitled "PIPE ISOLATION DEVICE,". Both applications are incorporated by reference in their entirety for all purposes.

FIELD OF DISCLOSURE

In general, the disclosure describes a pipe isolation device for use in pipes. The pipe isolation device may be used in pipelines carrying fluids such as pressurized fluids, high or low temperature fluids, steam, or hazardous fluids.

BACKGROUND OF DISCLOSURE

When performing pipeline maintenance or servicing, such as during hot tapping procedures, it is necessary to provide isolation of a "live" section of pipe. One such technique is using a "double isolation-and-bleed" apparatus, also referred to as a double block-and-bleed apparatus. As the term double isolation-and-bleed is known in the art, it refers to the setting of two seals in a pipe with a bleed port located therebetween. If fluid leaks past the first seal, it is contained by the second seal and forced to exit the pipe through the bleed port. The double isolation-and-bleed pipe isolation devices known in the industry generally comprise a series of pivoting arms. Due to the challenging environment, the pivoting arms represent points of potential failure. Another technique is using a pipe isolation device having a single sealing head having a pivoting arm to provide isolation of a "live" section of pipe.

What is needed is an improved, simplified, pipe isolation device that can accommodate a wide range of pipe sizes and thicknesses, as well as a wide range of pressurized fluids.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limiting the scope of the claimed subject matter.

An embodiment of the present disclosure provides a pipe isolation device including a control bar head and a first sealing head. The first sealing head has a first seal element and a first sliding engagement. The first sliding engagement permits the first sealing head to slide relative to the control bar head along a first fixed path and traverse a right angle to gain access to an interior space of a pipe. The pipe isolation device further includes a second sealing head having a second seal element and a second sliding engagement. The second sliding engagement permits the second sliding head to slide relative to the first sealing head along a second fixed path and traverse the right angle to gain access to an interior space of the pipe.

Another embodiment of the present disclosure provides a method of isolating a pipe including conveying a first sealing head and a second sealing head in a fully retracted position through a lateral access opening in the pipe. The first sealing head is slidably connected to a control bar head and the second sealing head is slidably connected to the first sealing head. The method further includes sliding the first sealing head along a first sliding engagement and sliding the second sealing head along a second sliding engagement to a fully set position as the control bar head continues its travel through the lateral access opening. The first sealing head and the second sealing head each form a seal in the pipe in the fully set position. The method further includes locking the first sealing head and the second sealing head in the fully retracted position with a locking mechanism in a locked state as the first sealing head and the second sealing head travel through the lateral access opening. The method further includes releasing the locking mechanism from the locked state to the unlocked state in response to an applied force as the control bar head is conveyed through the lateral access opening so as to permit the first sliding head and the second sliding head to move to the fully set position.

Another embodiment of the present disclosure provides a pipe isolation device including a control bar head, a first sealing head, and a second sealing head. The first sealing head and the second sealing head are positionable between a fully retracted position and a fully set position. The first sealing head and the second sealing head have an in-line orientation with the control bar head in the fully retracted position and have a concentric orientation with one another in the fully set position. The pipe isolation device further includes a first sliding engagement slidably connecting the first sealing head to the control bar head, and a second sliding engagement slidably connecting the second sealing head to the first sealing head. The first sliding engagement and the second sliding engagement are configured to slide the first sealing head and the second sealing head from the fully retracted position to the fully set position during a linear travel of the control bar head.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
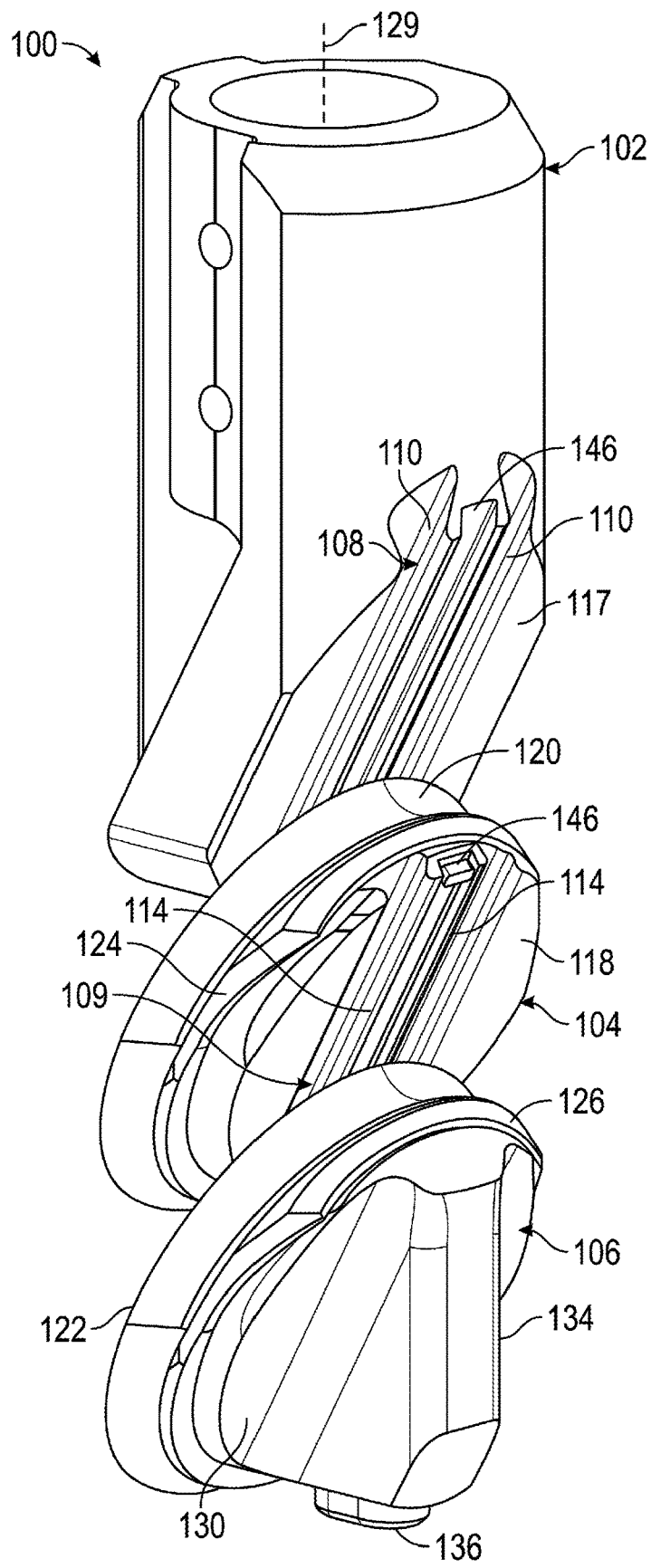
FIG. 1 is a perspective view of a pipe isolation device in a fully retracted position in accordance with embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

The present disclosure generally relates to achieving at least one seal in a pipe. Embodiments may have multiple seals in a pipe with a depressurized zone between the seals. This increases the safety of plugging a pipe by having a back-up seal and allows for any leakage past the primary seal to be vented out the bleed port. Some embodiments of the pipe isolation device of the present disclosure achieve the multiple seals through one branch opening in the pipe so that it reduces the amount of equipment involved in safely sealing or isolating the pipe.

Embodiments of the pipe isolation device of the present disclosure may be a tool that has a first sealing head and a second sealing head and provides a means to achieve two (or more) seals inside a pipe between the sealing heads. The pressure in the space between the two seals can be bled so that one seal is a primary seal and the other is a secondary backup seal. The tool is set by traveling through a tapped hole forming a lateral access opening inside a fitting branch on the pipe and product flow can continue through this fitting if a bypass line is set up. The pipe isolation device is configured to traverse a right angle as the pipe isolation device extends through the lateral access opening and uses sliding engagements to move the sealing heads of the pipe isolation device forward in the pipe to position the sealing heads in a concentric orientation with one another and with the pipe.

Referring to FIGS. 1-4, an embodiment of the pipe isolation device, referenced generally as 100, of the present disclosure is shown. Pipe isolation device 100 comprises a control bar head 102, a first sealing head 104, and a second sealing head 106. Sealing heads 104, 106 each have a disk shape. Sealing heads 104, 106 may slide relative to each other, and the first sealing head 104 may slide relative to the control bar head 102 to position the pipe isolation device 100 between a fully retracted position shown in FIG. 1 to a fully set position shown in FIG. 2.

Figure 2:
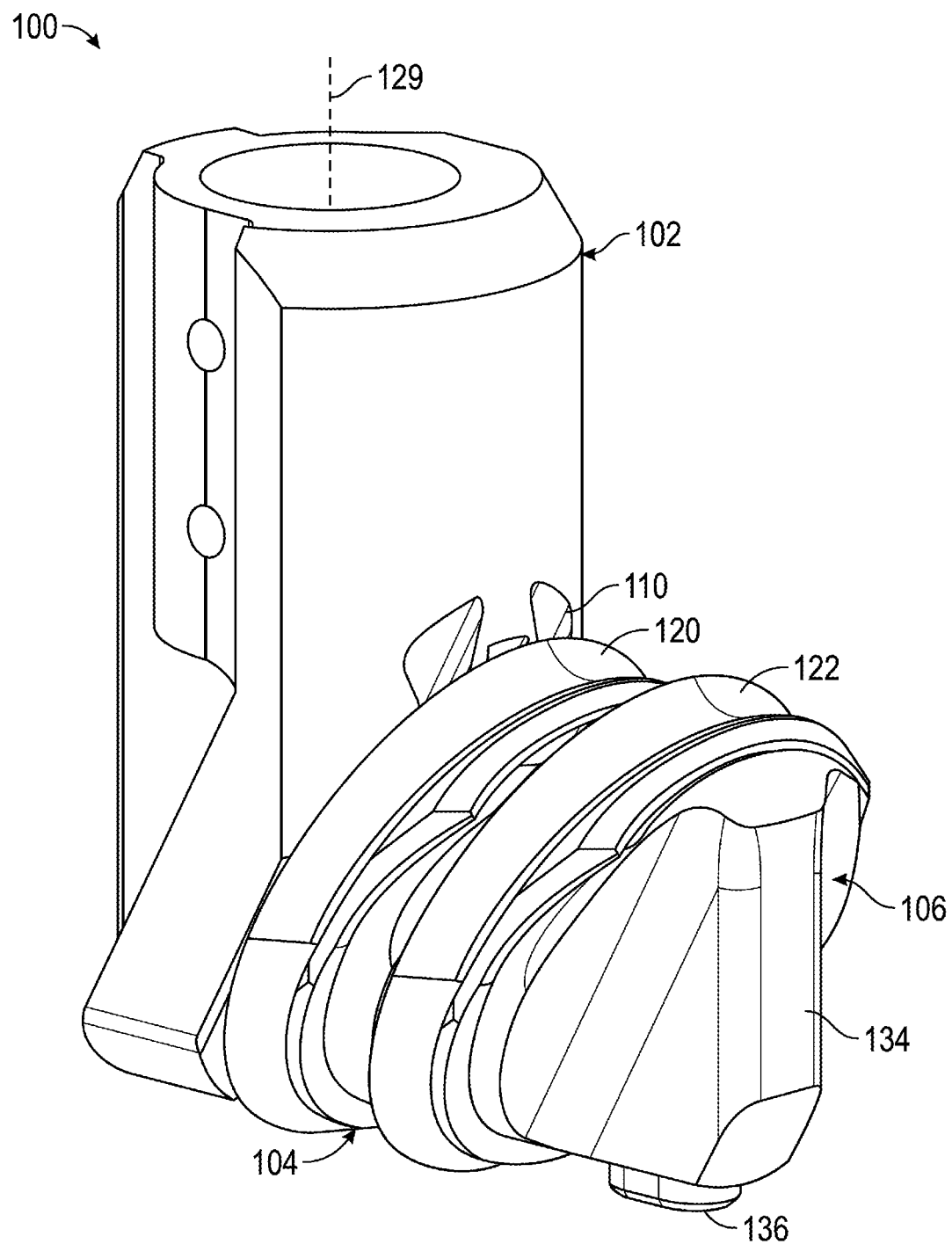
FIG. 2 is a perspective view of the pipe isolation device in a fully set position in accordance with embodiments of the present disclosure.

Control bar head 102 may be attached to a control bar of an actuator (not shown), typically hydraulically powered, and the pipe isolation device 100 may be translated through a fitting branch of a pipe in the fully retracted position, shown in FIG. 1, and moved in the pipe to the fully set position, shown in FIG. 2. Control bar head 102 is a carrier for the sealing heads 104, 106 and is used to convey the sealing heads 104, 106.

Figure 4:
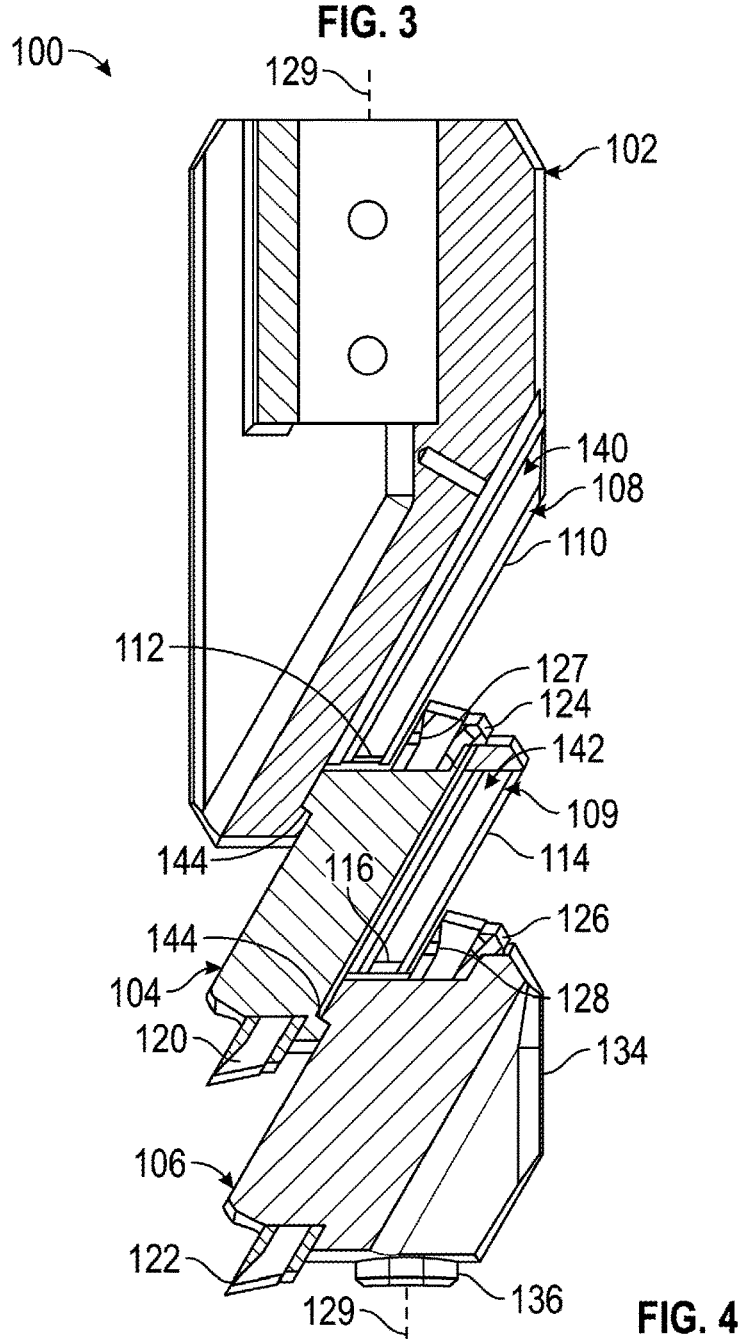
FIG. 4 is a cross-sectional view taken along line 4-4 in FIG. 3.

Pipe isolation device 100 further includes a first sliding engagement 108 for providing a slidable engagement connection between the control bar head 102 and the first sealing head 104, and a second sliding engagement 109 for providing a slidable engagement connection between the first sealing head 104 and the second sealing head 106, see FIG. 1 and FIG. 4. First sliding engagement 108 may be formed by a pair of first guide tracks 110, see FIG. 1 and FIG. 4, attached to a side of the control bar head 102 and the first guide members 112, see FIG. 4, attached to a first side of the first sealing head 104. Each of the first guide members 112 is interconnected with one of the first guide tracks 110, as shown in FIG. 4, to provide for sliding engagement between the control bar head 102 and the first sealing head 104. First guide tracks 110 extend along a control bar surface 117. Control bar surface 117 is at an acute angle with respect to a vertical axis 129 extending through a center of the control bar head 102.

In another embodiment, the first sliding engagement 108 may be formed by one first guide track 110 and one first guide member 112 interconnected with one another to form a sliding engagement. In another embodiment, more than two first guide tracks 110 and first guide members 112 may be used to form the first sliding engagement 108 interconnecting the control bar head 102 and the first sealing head 104. In another embodiment, one or more first guide tracks 110 may be attached to the first sealing head 104, and one or more first guide members 112 may be attached to the control bar head 102 to form the first sliding engagement 108 between the control bar head 102 and the first sealing head 104.

Second sliding engagement 109 may be formed by a pair of second guide tracks 114 and second guide members 116, see FIG. 1 and FIG. 4. Second guide tracks 114 are attached to a second side of the first sealing head 104 and second guide members 116 are attached to an opposing first side of the second sealing head 106. Each of the second guide members 116 is interconnected with one of the second guide tracks 114, see FIG. 4 and FIG. 9, to provide for sliding engagement between the first sealing head 104 and the second sealing head 106. Second guide tracks 114 extend along an outer surface 118 of the first sealing head 104, and second guide members 116 extend along an inner surface of the second sealing head 106 that opposes the outer surface 118 of the first sealing head 104. Outer surface 118 is at an acute angle with respect to the vertical axis 129.

In another embodiment, the second sliding engagement 109 may be formed by one second guide track 114 and one second guide member 116 interconnected with one another. In another embodiment, more than two second guide tracks 114 and second guide members 116 may be used to form the second sliding engagement 109 interconnecting the sealing heads 104, 106. In another embodiment, one or more second guide tracks 110 may be attached to the second sealing head 106 and one or more second guide members 116 may be attached to the first sealing head 104 to form the second sliding engagement 109 between the sealing heads 104, 106.

First sealing head 104 has a first seal element 120 and the second sealing head 106 has a second seal element 122, see FIGS. 1-2. First seal element 120 extends around a main body of the first sealing head 104 and the second seal element 122 extends around a main body of the second sealing head 106 to form circumferential seal elements. Seal elements 120, 122 may be made from elastomeric materials. First seal element 120 is disposed along a first outer perimeter of the first sealing head 104 to form the first circumferential seal element. Second seal element 122 is disposed along a second outer perimeter of the second sealing head 106 to form the second circumferential seal element. A first nose ring 124 may be positioned adjacent to the first seal element 120, and a second nose ring 126 may be positioned adjacent to the second seal element 122. A first retaining ring 127 may be positioned adjacent to the first seal element 120, and a second retaining ring 128 may be positioned adjacent to the second seal element 122, see FIG. 4.

First seal element 120 is disposed between the first nose ring 124 and the first retaining ring 127, and the second seal element 122 is disposed between the second nose ring 126 and the second retaining ring 128. Nose rings 124, 126 and retaining rings 127, 128 provide support to the seal elements 120, 122 and prevent the seal elements 120, 122 from extruding when under pressure.

Second sealing head 106 has an outer surface 130 with a nose element 134 extending outwardly therefrom. One or more pads 136 may be attached to the sealing heads 104, 106. Pads 136 may be made of brass, iron, polymer or other material that allows for sliding of the sealing heads 104, 106. In the embodiment of pipe isolation device 100 shown in FIGS. 1-4, a pad 136 is attached to a bottom section of the nose element 134. Sliding engagements 108, 109 are configured so that the pad 136 slide along a pipe ID as the pipe isolation device 100 is translated through the fitting branch of the pipe from the fully retracted position, shown in FIG. 1, to the fully set position, shown in FIG. 2. Pads 136 may be referred to as a skid element or nose pad. Pad 136 positions the sealing heads 104, 106 concentric in the pipe and slides along the bottom of the pipe as the pipe isolation device 100 moves to the fully set position. As the pipe isolation device 100 moves from the fully retracted position to the fully set position, the sealing heads 104, 106 move outwardly away from the vertical axis 129 that extends through the control bar head 102.

Figure 3:
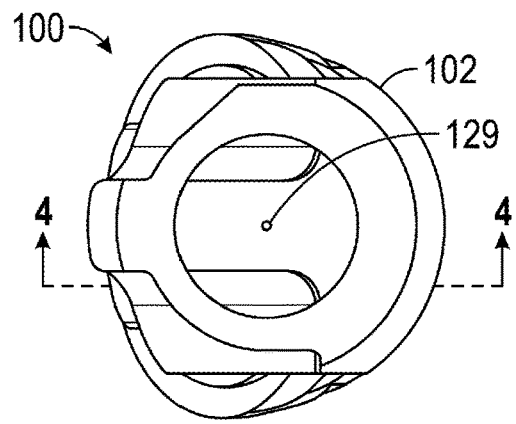
FIG. 3 is a top view of the pipe isolation device in the fully retracted position in accordance with embodiments of the present disclosure.

Referring to FIG. 3, a top view of an embodiment of the pipe isolation device 100 in a fully retracted position is shown. FIG. 4 shows a cross-section at section lines 4-4 of the pipe isolation device 100 shown in FIG. 3. Sealing heads 104, 106 are oriented in-line with the control bar head 102 when in the fully retracted position. Vertical axis 129 extends through the sealing heads 104, 106 and through the center of the control bar head 102 and illustrates that the sealing heads 104, 106 and the control bar head 102 are oriented in-line with one another when in the fully retracted position.

Referring to FIG. 4, one of the first guide tracks 110 is shown with one of the first guide members 112 interlocked in the first guide track 110, and one of the second guide tracks 114 is shown with one of the second guide members 116 interlocked in the second guide track 114. Each first guide track 110 includes a first track slot 140 that is elongated and formed by interior walls of the elongated, first guide track 110. First track slots 140 may have a dovetail shape, T-shape, C-shape, or other shape where the first guide members 112 have a corresponding dovetail shape, T-shape, C-shape, or other shape corresponding to the track slots 140 and the first guide members 112 are retained in the first track slots 140.

First guide tracks 110 and the first guide members 112 define a first fixed path for the first sealing head 104. First sliding engagement 108 is configured to permit the first sealing head 104 to move along the first fixed path between the first retracted position and the first set position. First sealing head 104 moves along the first fixed path with each of the first guide members 112 engaged with one of the first guide tracks 110 and moving in the first track slots 140 so that the first sealing head 104 moves from a first retracted position, shown in FIG. 1, to a first set position, shown in FIG. 2.

First guide tracks 110 are oriented at an acute angle with respect to the vertical axis 129 of the control bar head 102, and the first sealing head 104 moves outwardly with respect to the vertical axis 129 as the first sealing head 104 moves from the first retracted position, shown in FIG. 1, to the first set position, shown in FIG. 2. This outward movement of the first sealing head 104 with respect to the vertical axis 129 as the first sealing head 104 moves from the first retracted position to the first set position allows the first sealing head 104 to traverse the right angle between a pipe inlet and a pipe.

Each second guide track 114 includes a second track slot 142 that is elongated and formed by interior walls of the elongated, second guide track 114. Second track slots 142 may have a dovetail shape, T-shape, C-shape, or other shape.

Second guide members 116 have a corresponding dovetail shape, T-shape, C-shape, or other shape corresponding to track slots 140 and are retained in the second track slots 142. In some embodiments, guide members 112, 116 may include at least one load bearing roller engageable within guide tracks 110, 114 to form the sliding engagements 108, 109.

Second guide tracks 114 and second guide members 116 define a second fixed path for the second sealing head 106. Second sliding engagement 109 is configured to permit the second sealing head 106 to move along the second fixed path between the second retracted position and the second set position. Second sealing head 106 moves along the second fixed path with each of the second guide member 116 engaged with one of the second guide tracks 114 and moving in the second track slot 142 so that the second sealing head 106 moves from the second retracted position, shown in FIG. 1, to the second set position, shown in FIG. 2.

Second guide tracks 114 are oriented at an acute angle with respect to the vertical axis 129 of the control bar head 102 and the second sealing head 106 moves outwardly from the vertical axis 129 as the second sealing head 106 moves from the fully retracted position, shown in FIG. 1, to the fully set position, shown in FIG. 2. This outward movement of the second sealing head 106 with respect to the vertical axis 129 as the second sealing head 106 moves from the second retracted position to the second set position allows the second sealing head 106 to traverse the right angle between a pipe inlet and a pipe. First guide tracks 110 and the second guide tracks 114 are parallel in the embodiment shown in FIG. 4.

Guide tracks 110, 114 each include a first track stop 144, that prevents the sealing heads 104, 106 from traveling downwards in the guide tracks 110, 114 when the pipe isolation device 110 is in the fully retracted position, shown in FIG. 4. First track stops 144 block sealing heads 104, 106 from moving downwards in the guide tracks 110, 114 and falling off a bottom end of the guide tracks 110, 114. As shown in the embodiment of FIG. 4, one of the first track stops 144 is located at a bottom section of each of the guide tracks 110, 114 to position the sealing heads 104, 106 in the fully retracted position.

Guide tracks 110, 114 may each include a second track stop 146, as shown in FIG. 1, disposed at a top section of the guide tracks 110, 114. Second track stops 146 may be in the form of a stop block, as shown in FIG. 1. Second track stops 146 block sealing heads 104, 106 from moving upwards in the guide tracks 110, 114. Track stops 144, 146 retain the sealing heads 104, 106 within a selected section of the guide tracks 110, 114. Track stops 146 position the sealing heads 104, 106 concentrically with one another in the fully set position and prevent the sealing heads 104, 106 from travelling beyond and falling off a top end of the guide tracks 110, 114.

Figure 5:
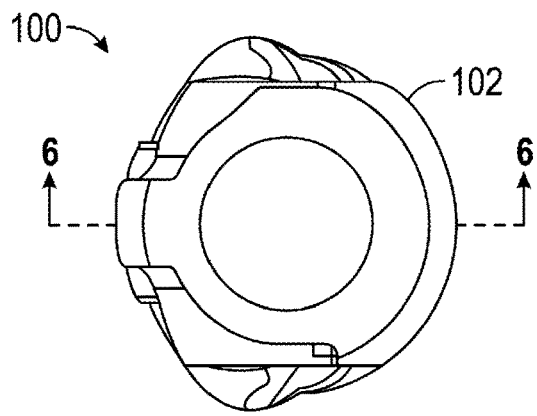
FIG. 5 is a top view of the pipe isolation device in the fully retracted position in accordance with embodiments of the present disclosure.
Figure 6:
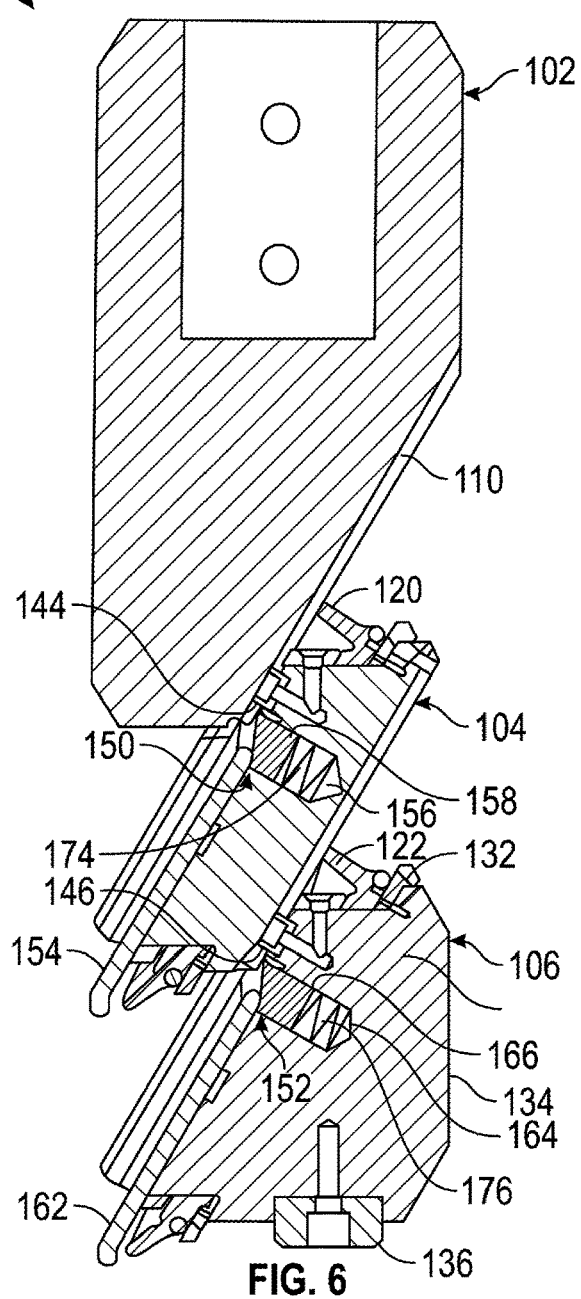
FIG. 6 is a cross-sectional view taken along line 6-6 in FIG. 5.

FIG. 5 shows a top view of an embodiment of the pipe isolation device 100 in a fully retracted position. FIG. 6 shows a cross-section at section lines 6-6 of the pipe isolation device 100 shown in FIG. 5. Referring to FIG. 6, an embodiment is shown of a locking mechanism including a first locking mechanism 150 for temporarily locking the first sealing head 104 in the first retracted position and a second locking mechanism 152 for temporarily locking the second sealing head 106 in the second retracted position. The locking mechanism locks the sealing heads 104, 106 in the fully retracted position with the locking mechanism in a locked state as the sealing heads 104, 106 travel through a lateral access opening of a pipe. The locking mechanism releases from the locked state to an unlocked state in response to an applied force as the control bar head 102 is conveyed through the lateral access opening. The locking mechanism in the unlocked state permits the first sliding head and the second sliding head to move to the fully set position. The locking mechanism is configured to lock at least one of the sealing heads 104, 106 in the fully retracted position and to unlock at least one of the sealing heads 104, 106 in response to an applied force.

The first locking mechanism 150, as shown in FIG. 6, is formed by a first push rod 154 attached to the first sealing head 104, a first pocket 156 in the first sealing head 104, and a first latch 158 disposed in the first pocket 156. First latch 158 is biased to engage with the first track stop 144 on the first guide track 110. The engagement between the first latch 158 and the first track stop 144 secures the first sealing head 104 in the first retracted position, as shown in FIG. 6, to place the first sealing head 104 in a first locked state. The engagement between the first latch 158 and the first track stop 144 may be a frictional engagement that secures the first sealing head 104 in the first locked state. In some embodiments, the engagement between the first latch 158 and the first track stop 144 may be an abutment engagement that secures the first sealing head 104 in the first locked state. The first locked state temporarily locks the first sealing head 104 in the first retracted position.

First push rod 154 may be moved upwards in the first sealing head 104 by applying a second applied force against a bottom end of the first push rod 154 to force a top end of the first push rod 154 against a top end of first latch 158. First push rod 154 moves forward with enough force to overcome the bias of the first latch 158 and to depress the first latch 158 into the first pocket 156. The bias of the first latch 158 may be provided by a first spring 174 attached to the first latch 158 or another biasing member that biases the first latch 158 out of the first pocket 156. In operation, the first push rod 154 may be actuated when the first push rod 154 engages and is displaced by a bottom of a pipe as the pipe isolation device 100 moves from the fully retracted position to the fully set position. First locking mechanism 150 changes or releases to the first unlocked state in response to the second applied force meeting a second force threshold. The first locking mechanism 150 is placed into the first unlocked state when the first latch 158 is pushed into the first pocket 156 so that the first latch 158 is disengaged with the first track stop 144. The disengagement between the first latch 158 and the first track stop 144 places the first sealing head 104 in the first unlocked state so that the first sealing head 104 is permitted to move from the first retracted position to the first set position.

The second locking mechanism 152, as shown in FIG. 6, is formed by a second push rod 162 attached to the second sealing head 106, a second pocket 164 in the second sealing head 106, and a second latch 166 disposed in the second pocket 164. Second latch 166 is biased to engage with the second track stop 146 on the second sealing head 106. The engagement between the second latch 166 and the second track stop 146 secures the second sealing head 106 in the second retracted position, as shown in FIG. 6, to place the second sealing head 106 in a second locked state. The engagement between the second latch 166 and the second track stop 146 may be a frictional engagement that secures the second sealing head 106 in the second locked state. In some embodiments, the engagement between the second latch 166 and the second track stop 146 may be an abutment engagement that secures the second sealing head 106 in the second locked state. The second locked state temporarily locks the second sealing head 104 in the second retracted position.

Second push rod 162 may be moved upwards in the second sealing head 106 by applying a first applied force against a bottom end of second push rod 162 to force a top end of the second push rod 162 against a top end of second latch 166. Second push rod 162 moves forward with enough force to overcome the bias of the second latch 166 and to depress the second latch 166 into the second pocket 164. The bias of the second latch 166 may be provided by a second spring 176 attached to the second latch 166 or another biasing member that biases the second latch 166 out of the second pocket 164. Springs 174, 176 may be compression springs. In operation, the second push rod 162 may be actuated when the second push rod 162 engages and is displaced by a bottom of a pipe as the pipe isolation device 100 moves from the fully retracted position to the fully set position. Second locking mechanism 152 changes or releases to the second unlocked state in response to the first applied force being applied meeting a first force threshold. Second locking mechanism 152 is placed into the second unlocked state when the second latch 166 is pushed into the second pocket 164 so that the second latch stop 168 does not block the second latch 166 and the second sealing head 106 is permitted to move from the second retracted position to the second set position.

Figure 7:
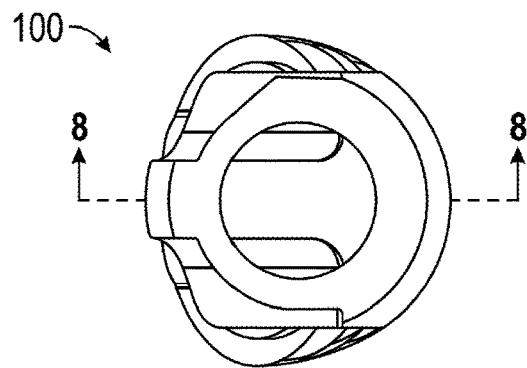
FIG. 7 is a top view of the pipe isolation device in the fully retracted position in accordance with embodiments of the present disclosure.
Figure 8:
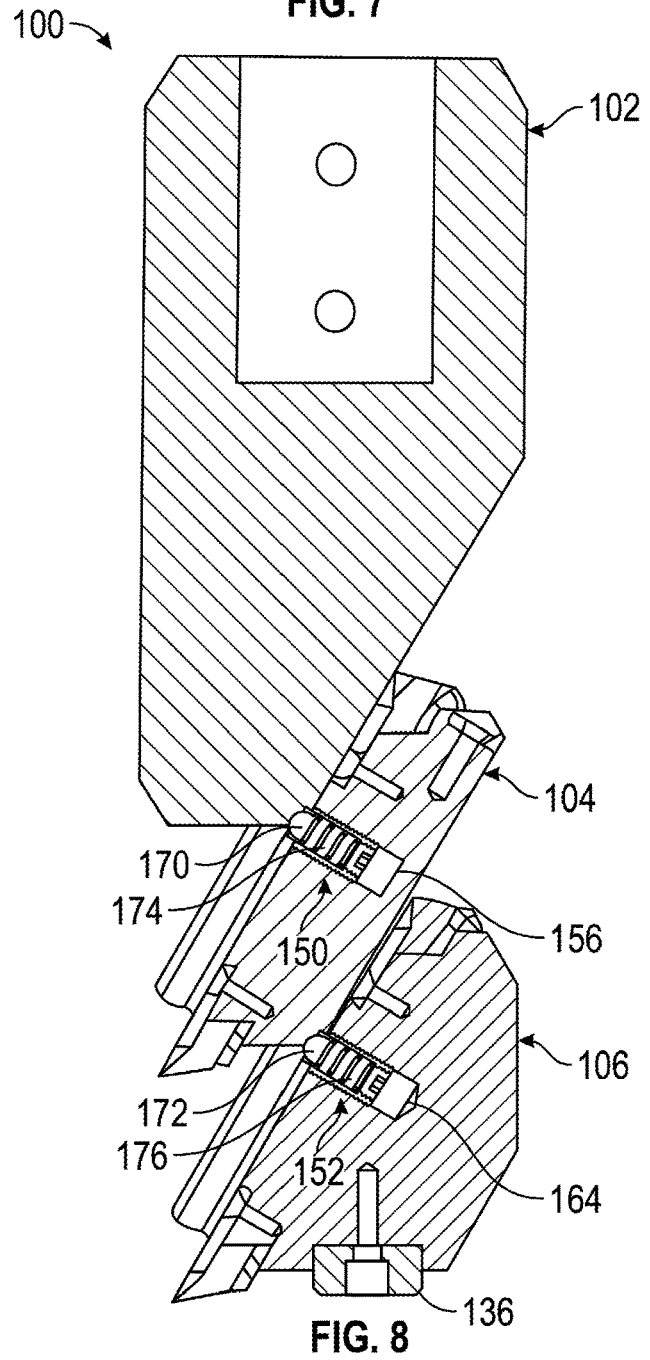
FIG. 8 is a cross-sectional view taken along line 8-8 in FIG. 7.

FIG. 7 shows a top view of an embodiment of the pipe isolation device 100 in a fully retracted position. FIG. 8 shows a cross-section at section lines 8-8 of the pipe isolation device 100 shown in FIG. 7. Referring to FIG. 8, the embodiment of the pipe isolation device 100 shown in FIG. 8 shows another embodiment of the locking mechanisms. In the embodiment shown in FIG. 8, the first locking mechanism 150 is formed by a first pin 170 and the second locking mechanism 152 is formed by a second pin 172. First pin 170 may be a detent pin and may be disposed in the first pocket 156 of the first sealing head 104. First spring 174 engages the first pin 170 to bias the first pin 170 out of the first pocket 156. First pin 170 is biased to engage with a surface of the control bar head 102 when the first sealing head 104 is in the first retracted position to place the first sealing head 104 in the first locked state.

A second applied force may be applied to the first locking mechanism 150 to overcome the biasing force of the first spring 174 and to depress the first pin 170 in first pocket 156. With the first pin 170 depressed in the first pocket 156, the first locking mechanism 150 is placed in the first unlocked state and the first sealing head 104 may be moved from the first retracted position to the first set position. In operation, the first pin 170 may be actuated by the first sealing head 104 engaging with a bottom of a pipe and applying the second applied force as the pipe isolation device 100 moves from the fully retracted position to the fully set position. The first locking mechanism 150 is moved from the first locked state to the first unlocked state in response to the second applied force meeting the second force threshold.

The second locking mechanism, as shown in FIG. 8, is formed by the second pin 172 disposed in the second pocket 164 of the second sealing head 106, and a second spring 176 biases the second pin 172 out of the second pocket 164. Second pin 172 may be a detent pin and may be biased to engage with a surface of the first sealing head 104 when the second sealing head 106 is in the second retracted position to place the second sealing head 106 in the second locked state.

A first applied force may be applied to the second locking mechanism 152 to overcome the biasing force of the second spring 172 and to depress the second pin 172 in the second pocket 164. With the second pin 172 depressed in the second pocket 164, the second locking mechanism 152 is placed in the second unlocked state and the second sealing head 106 may be moved from the second retracted position to the second set position. In operation, the second pin 172 may be actuated by the second sealing head 106 engaging with a bottom of a pipe and applying the first applied force as the pipe isolation device 100 moves from the fully retracted position to the fully set position.

In some embodiments, pins 170 and 172 are formed by shear pins. A shear pin or multiple shear pins are press-fit or threaded into the sealing heads 104, 106. The shear pin(s) in the second sealing head 106 are designed to shear at a lower force than the shear pin(s) of the first sealing head 104 so that the second sealing head 106 deploys before the first sealing head 104 deploys. The second sealing head 106 deploys when the second pin(s) 172 shear in response to the first applied force to allow the second sealing head 106 to move to the second set position and the first sealing head 104 deploys when the first pin(s) 170 shear in response to the second applied force to allow the first sealing head 104 to move to the first set position.

Second locking mechanism 152 may be moved from the second locked state to the second unlocked state in response to the first applied force meeting the first force threshold. The locking mechanisms may be configured so that the second sealing head 106 is deployed before the first sealing head 104. More specifically, the first force threshold may be less than the second force threshold so that the second sealing head 106 is deployed before the first sealing head 104 is deployed.

Figure 9:
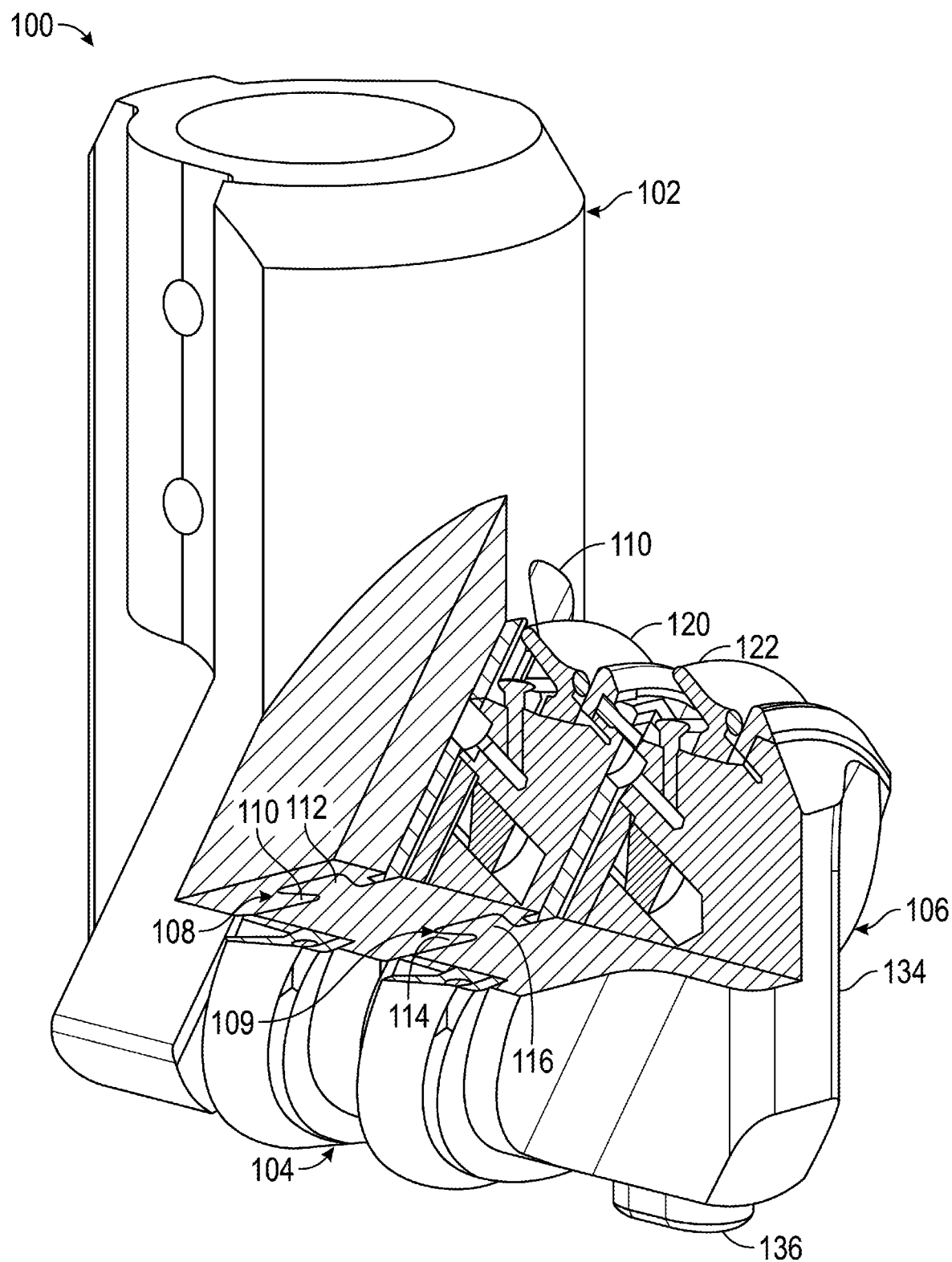
FIG. 9 is a partial, quarter-sectional view of the pipe isolation device in the fully set position in accordance with embodiments of the present disclosure.

Referring to FIG. 9, a partial, quarter-sectional view of the pipe isolation device 100 in the fully set position is shown to further illustrate the sliding engagements 108, 109 to provide sliding connections between the control bar head 102 and the first sealing head 104 and between the first sealing head 104 and the second sealing head 106. One of the first guide tracks 110 and one of the first guide members 112 of the first sliding engagement 108 are shown interlocked and slidably connected. Likewise, one of the second guide tracks 114 and one of the second guide members 116 are shown interlocked and slidably connected. Guide tracks 110, 114 have elongated first track slots 140 and second guide tracks 142, as shown in FIG. 4, that are dove-shaped, as illustrated in FIG. 9. Guide members 112, 116 are dove shaped to correspond with their respective guide tracks 110, 114.

Figure 10:
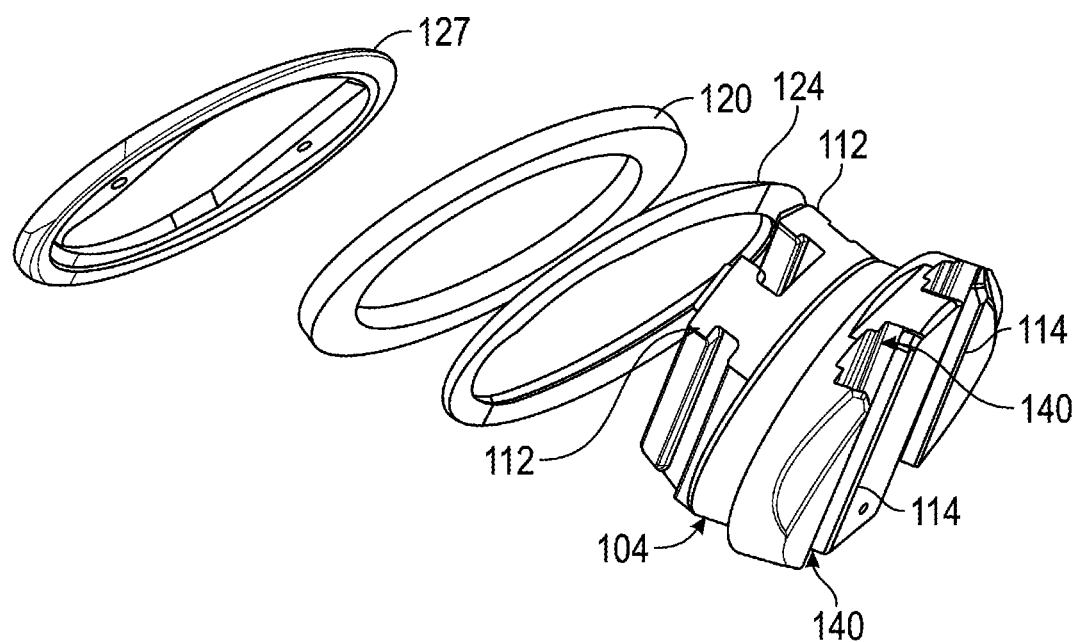
FIG. 10 is an exploded view of a first sealing head in accordance with embodiments of the present disclosure.

Referring to FIG. 10, an exploded view of an embodiment of the first sealing head 104 is shown. First seal element 120 is shown separated from the body of the first sealing head 104 to better illustrate the first seal element 104. When the first seal element 120 is attached to the body of the first sealing head 104, the first seal element 120 extends around the outer perimeter of the body of the first sealing head 104 to form a circumferential seal for sealing a pipe. First seal element 120 is disposed between the first nose ring 124 and the first retaining ring 127. First nose ring 124 and first backing ring 127 provide support to the first seal element 120. First retaining ring 127 and first nose ring 124 attach to the body of the first sealing head 104 and may have a shape that corresponds to the first seal element 120. Second seal element 122, second retaining ring 128, and second nose ring 126 for the second sealing head 106 may be like the first seal element 120 and supporting rings shown and described with respect to FIG. 10.

First sealing head 104 has the first guide members 112 on one side and has on the opposite side the second guide tracks 114. First guide members 112 have a T-shape. Second guide tracks 114 have first track slots 140 that are T-shaped. For the pipe isolation device 100 corresponding to the embodiment of the first sealing head 104 shown in FIG. 10, the first guide tracks 110 of the control bar head 102 have corresponding T-shapes to interconnect with the first guide members 112 to provide for sliding engagement between the control bar head 102 and the first sealing head 104. First guide tracks 110 extend along a control bar surface 117. For the pipe isolation device 100 corresponding to the embodiment of the first sealing head 104 shown in FIG. 10, the second guide members 116 of the second sealing head 106 have corresponding T-shapes to interconnect with the second guide tracks 114 of the first sealing head 104 to provide for sliding engagement between the first sealing heads 104, 106. First guide tracks 110 extend along a control bar surface 117.

Figure 11:
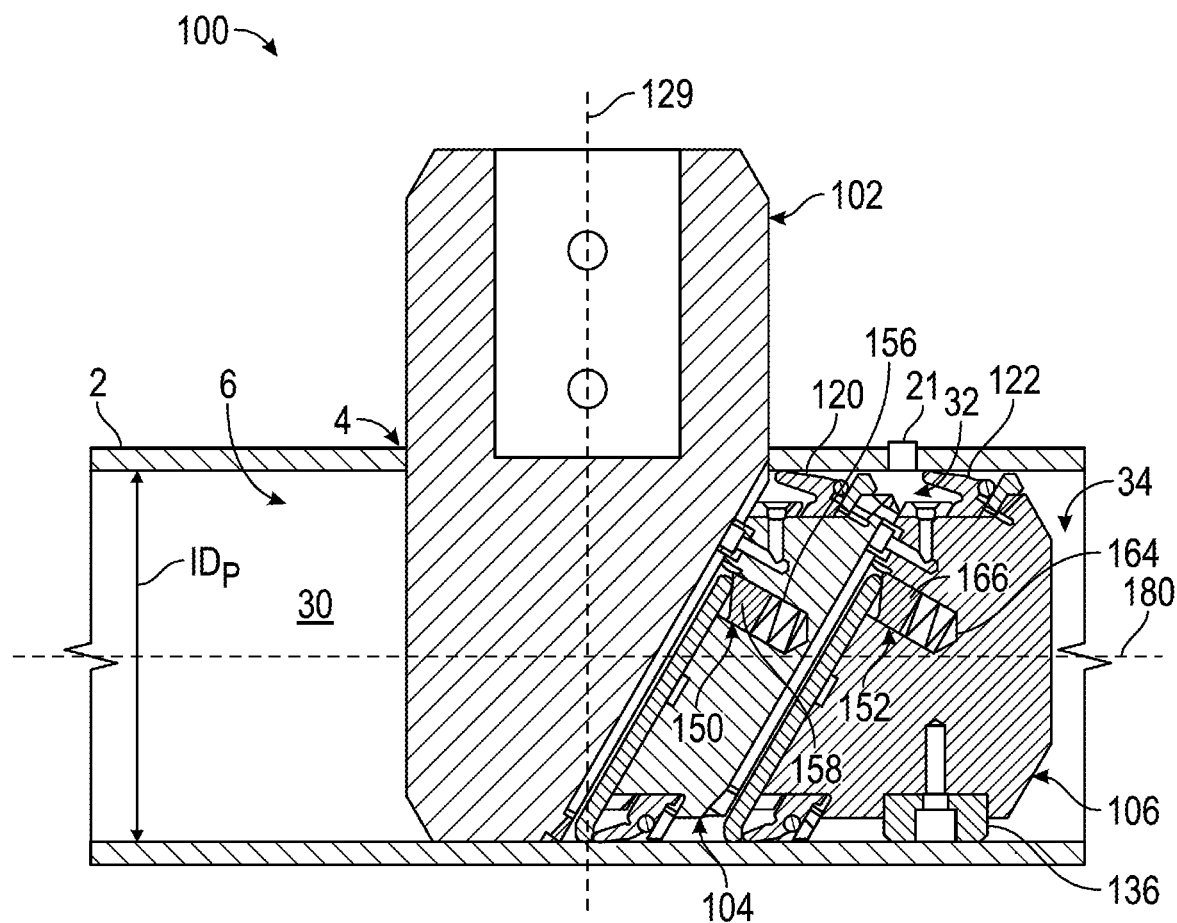
FIG. 11 is the cross-sectional view of the pipe isolation device of FIG. 6 shown in the fully set position and installed in a pipe in accordance with embodiments of the present disclosure.

Referring to FIG. 11, the embodiment of the pipe isolation device 100 of FIG. 6 is shown in the fully set position in a pipe 2 where the pipe isolation device 100 double blocks the pipe 2 using the first sealing head 104 and the second sealing head 106. Pipe isolation device 100 may be positioned in the pipe 2 by extending the pipe isolation device 100 in the fully retracted position, as shown in FIG. 6, into a lateral access opening 4 and into an interior space 6 of the pipe 2. Vertical axis 129 may extend through the center of the access opening 4. Pipe isolation device 100 is configured to translate from the fully retracted position, shown in FIG. 6, to the fully set position, shown in FIG. 11, as described below in more detail with respect to FIGS. 15-20.

Locking mechanisms 150, 152 are in the unlocked state when in the fully set position. More specifically, first latch 158 is depressed in the first pocket 156 as the first sealing head 104 moves from the first retracted position to the first set position and the second latch 166 is depressed in the second pocket 164 as the second sealing head 106 is moved from second retracted position to the second set position.

Figure 20:
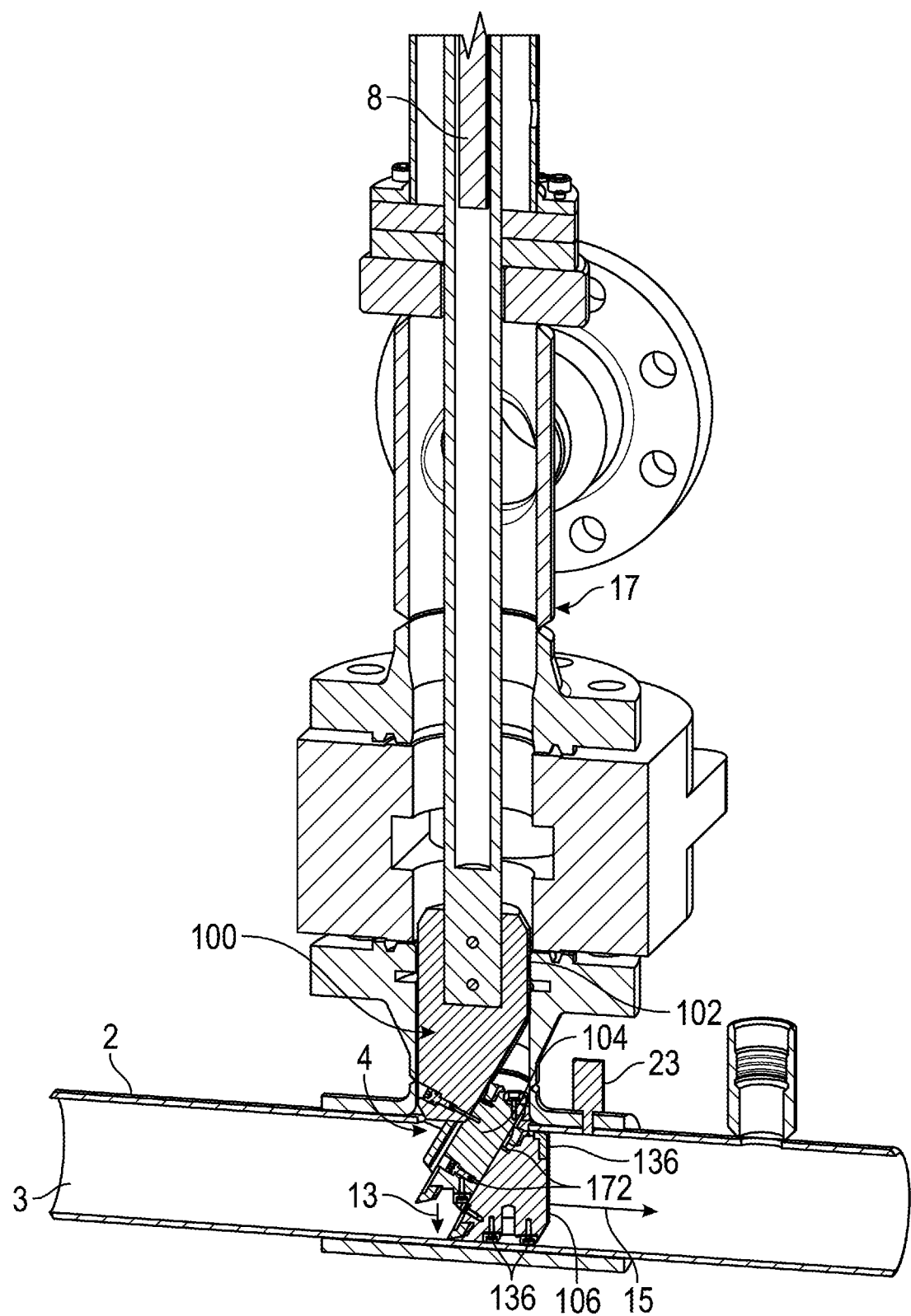

Seal elements 120, 122 seal against the interior diameter (ID) of the pipe 2 to double block the pipe 2 to form a live pipe zone 30, an isolated zone 32, and a zero-energy zone 34. The interior diameter (ID) of the pipe 2 is represented in FIG. 11 as $ID_P$. Live pipe zone 30 is on the pressurized side of the first seal element 120, of the first sealing head 104, the isolated zone 32 is between the first seal element 120 and the second seal element 122, and zero-energy zone 34 is downstream of the second sealing element 122 of the second sealing head 106. First sealing head 104 and the second sealing head 106 form a double block in the pipe 2. Fluid that leaks past the first seal element 120 flows into the isolated zone 32 and pressure from the fluid in the isolated zone 32 is bled out of the isolated zone 32. A bleed port 21 may extend through the pipe 2 to connect the isolated zone 32 to a bleed joint (not shown) to bleed off pressure that may form in the isolated zone 32. In some embodiments, pressure from the fluid in the isolated zone 32 is bled out of the isolated zone 32 through passageways extending from the isolated zone 32 and through the sealing heads 104, 106 and the control bar head 102, and fluidly coupled to a component on the branch of the pipe 2, such as the fitting, valve, housing, or actuator. The bleed joint may be formed by a T-joint. Joints may be used to access the interior space 6 of the pipe 2, for example, as shown in FIG. 20, a bleed joint 23 fluidly communicates with the isolated zone 32 and a joint 25 that fluidly communicates with the zero-energy zone 34.

Figure 12:
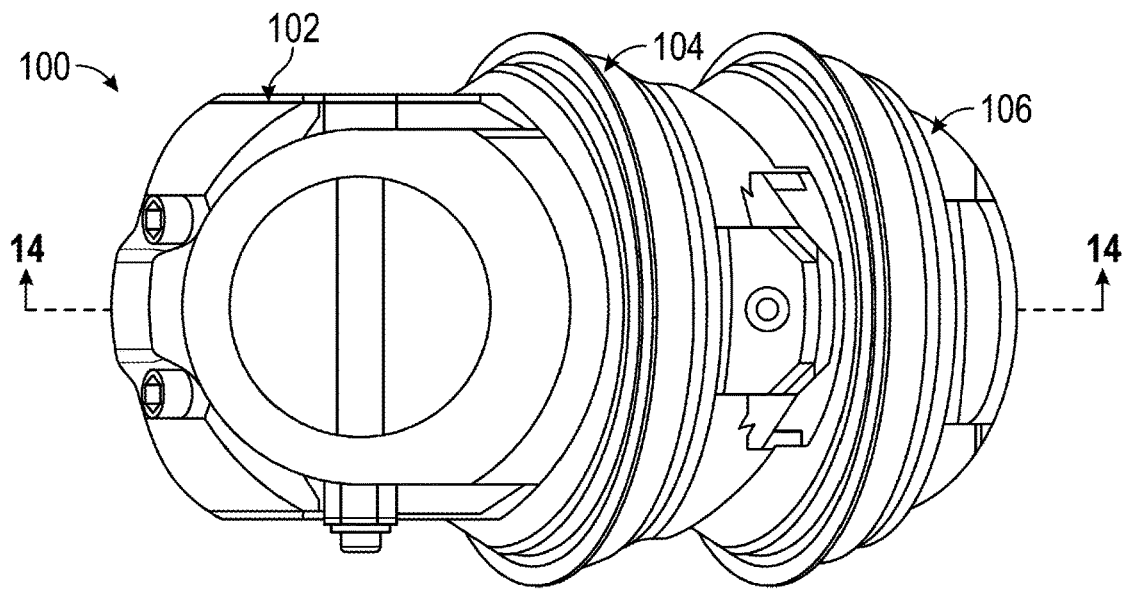
FIG. 12 is a top view of the pipe isolation device in the fully set position in accordance with embodiments of the present disclosure.
Figure 13:
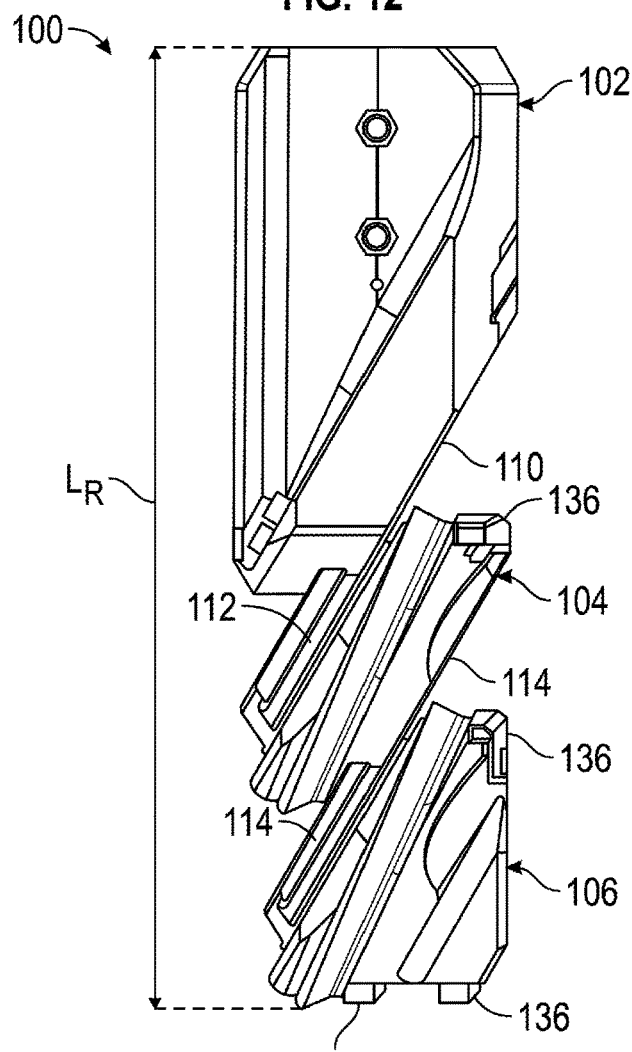
FIG. 13 is a side view of the pipe isolation device in the fully retracted position in accordance with embodiments of the present disclosure.
Figure 14:
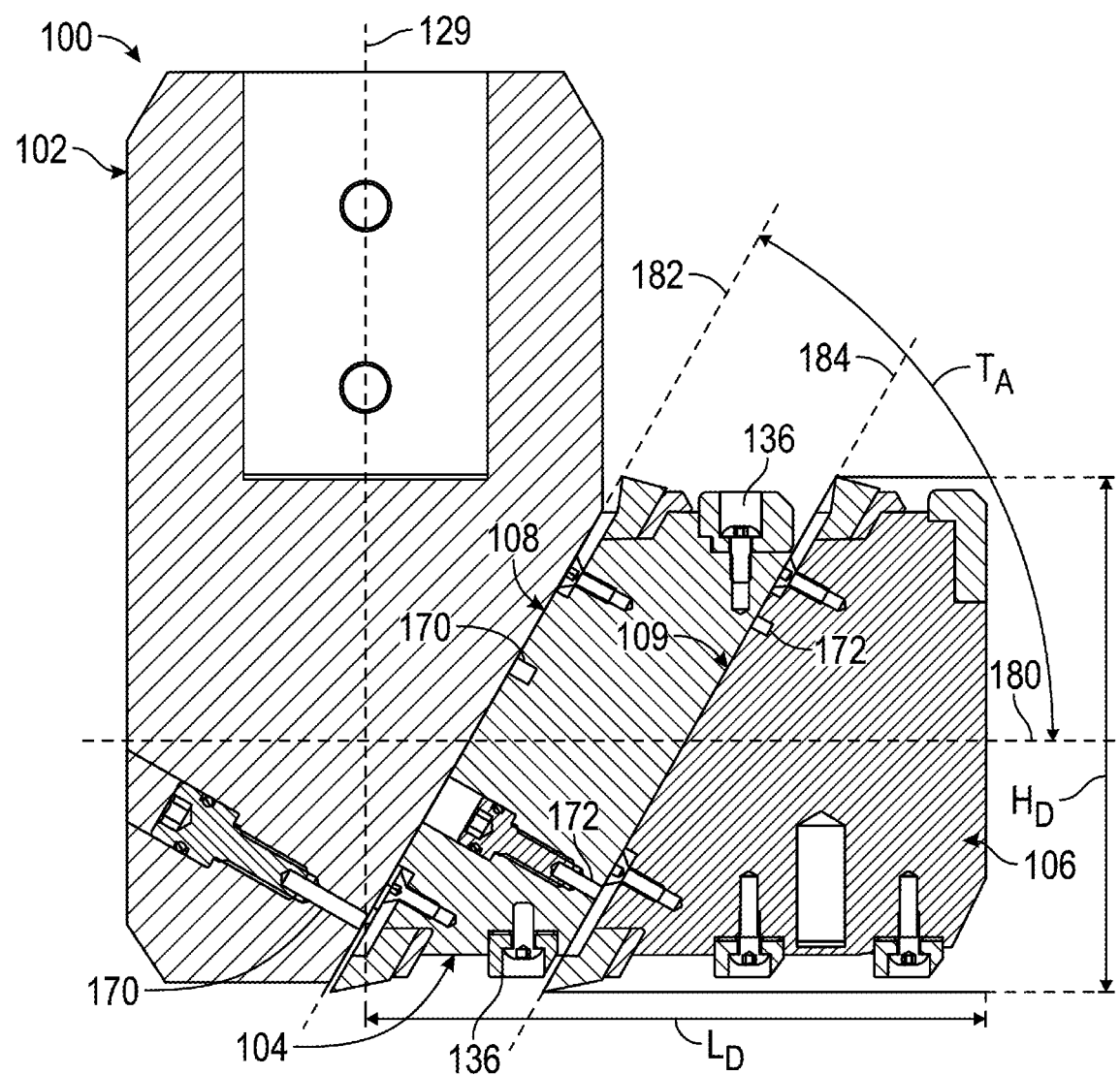
FIG. 14 is a cross-sectional view taken along line 14-14 in FIG. 12.

Referring to FIGS. 12-14, an embodiment of pipe isolation device 100 is shown. FIG. 12 shows a top view of the pipe isolation device 100 in the fully set position, and FIG. 13 shows a side view of the pipe isolation device 100 in the fully retracted position. FIG. 14 shows a cross-sectional view of the pipe isolation device 100 in the fully set position along section line 14-14 of FIG. 12. Like parts of the embodiments of the pipe isolation device 100 are labeled with like reference numbers. In the embodiment shown in FIGS. 12-14, pads 136 are attached to a top section and a bottom section of sealing heads 104,106 to slide along internal surface of a pipe and center the sealing heads 104, 106 in the pipe as the pipe isolation device 100 moves to the fully set position. Second pin 172 is formed by a shear pin and is shown in FIG. 14 after the second pin 172 has been sheared. First pin 170 is formed by a shear pin and is shown in FIG. 14 after the first pin has been sheared. Operation of pins 170, 172 shown in FIG. 14 is described in more detail with respect to FIGS. 18-23.

Pipe isolation device 100 has a retracted length $L_R$ in the fully retracted position, as shown in FIG. 13. When in the fully set position shown in FIG. 14, first sealing head 104 and second sealing head 106 are aligned with one another to form a cylindrical shape and have a perpendicular orientation with respect to the control bar head 102, as illustrated by a horizontal axis 180 extending through control bar head 102 and sealing heads 104, 106. Horizontal axis 180 extends through a center of the sealing heads 104, 106 and is perpendicular to vertical axis 129 extending through the center of the control bar head 102. Horizontal axis 180 may align with the center axis of a pipe when the pipe isolation device 100 is deployed in the fully set position in the pipe.

First sliding engagement 108 is configured so that the first sealing head 104 moves along the first fixed path, as depicted by first track axis 182, and the second sliding engagement 109 is configured so that the second sealing head 106 moves along the second fixed path, as depicted by second track axis 184, as the pipe isolation device 100 moves from the fully retracted position to the fully set position. The fixed paths of sliding engagements 108 may be formed by guide tracks 110, 114. The fixed paths formed by the guide tracks 110, 114 are at an acute angle, referred to as the track angle $T_A$, with respect to the horizontal axis 180 extending through the center of the sealing heads 104, 106, as shown by track angle $T_A$. In some embodiments, track angle $T_A$ may be from 46 degrees to 70 degrees from the horizontal axis 180, as described below:

$$46° \le T_A \le 70°$$

Pipe isolation device 100 in the fully set position has a deployed length $L_D$ and a deployed height $H_D$, as shown in FIG. 14. Deployed length $L_D$ is measured from the vertical axis 129 extending through the center of the control bar 102 to the end of the second sealing head 106. Deployed height $H_D$ is measured from the top to the bottom of the sealing heads 104, 106. In some embodiments, the deployed height $H_D$ may be measured at an outermost surface of the pads 136 on the bottom and top sections of the sealing heads 104, 106. The deployed height $H_D$ of the sealing heads 104, 106 is approximately the interior diameter (ID) of the pipe that the pipe isolation device 100 may be deployed. Sliding engagements 108, 109 provide a compact deployed length $L_D$ for the pipe isolation device 100.

The compact deployed length $L_D$ helps the pipe isolation device 100 stay within the bounds of a fitting sleeve (not shown) that may be formed around a lateral access opening through which the pipe isolation device 100 is inserted when in the fully set position. Limiting the deployed length $L_D$ and staying within the bounds of a fitting sleeve helps prevent damage to the pipe due to the reaction loads of the pipe isolation device 100 against the pipe when the pipe is pressurized.

Pipe isolation device 100, in some embodiments, is configured for a pipe having a lateral access opening that has a diameter size approximately equal to the internal diameter (ID) of the pipe being sealed, sometimes referred to as a size-on-size tap. The length of a typical fitting sleeve $FS_L$ on a pipe for a full-encirclement pipe fitting is approximately the length of the internal diameter of the pipe from the center axis of the pipe branch to one of the first sleeve ends.

The deployed length $L_D$ of the pipe isolation device is limited with respect to the deployed height $H_D$ of the sealing heads 104, 106. The deployed length $L_D$ of the pipe isolation device 100 is limited with respect to the retracted length $L_R$ of the pipe isolation device 100. Limiting the deployed length $L_D$ with respect to the deployed height $H_D$ and the retracted length $L_R$ is advantageous. In some embodiments, the ratio of deployed length $L_D$ of the pipe isolation device 100 and deployed height $H_D$ of the sealing heads 104, 106 is in the following range:

$$0.56 \leq \frac{L_D}{H_D} \leq 1.60$$

The size of a pipe isolation device 100 is selected to correspond to the internal diameter of the selected pipe that will be sealed, and accordingly, different pipe isolation devices 100 may have different deployed lengths $L_D$, retracted lengths $L_R$, and deployed heights $H_D$ depending on the internal diameter of the selected pipe to be sealed. In some embodiments, the ratio of the retracted length $L_R$ of the pipe isolation device 100 and the internal diameter, referred to as $ID_P$, of the selected pipe to be sealed is in the following range:

$$2.25 \leq \frac{L_R}{ID_P} \leq 4.00$$

The deployed height $H_D$ of the pipe isolation device 100 to be used in the selected pipe may be equal to the internal diameter $ID_P$ of the selected pipe.

An overall compact size of the pipe isolation device 100 is beneficial and may help with installation of the pipe isolation device 100 when there is limited space for installation at the location of the lateral access opening.

Figure 15:
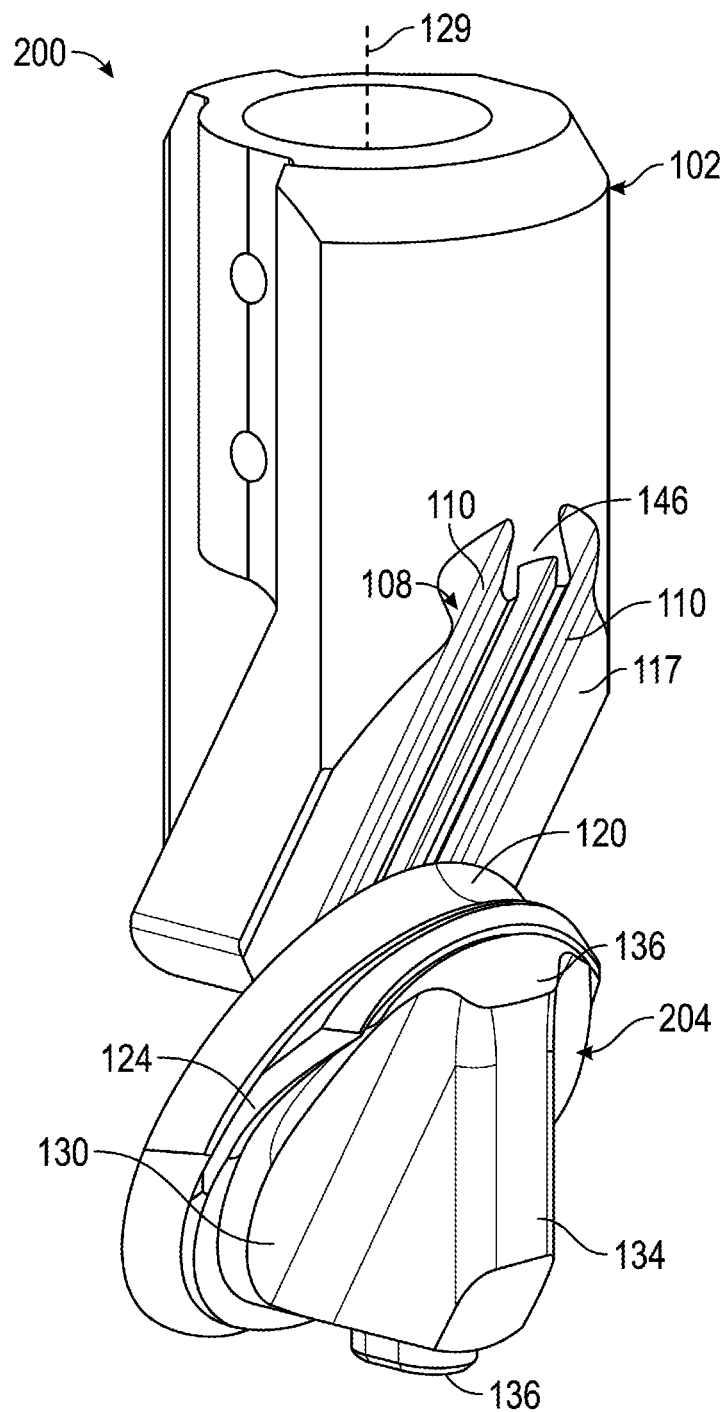
FIG. 15 is a perspective view of an embodiment of the pipe isolation device having a single sealing head in a fully retracted position in accordance with embodiments of the present disclosure.
Figure 16:
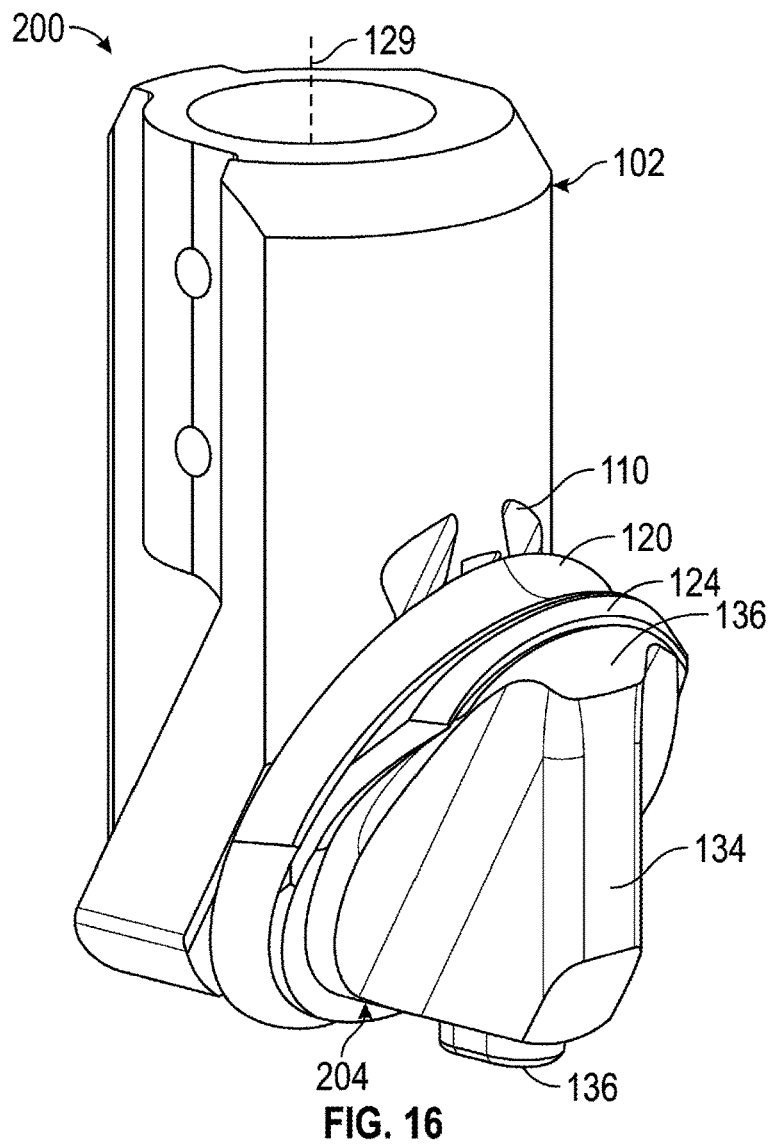
FIG. 16 is a perspective view of the pipe isolation device having the single sealing head in a fully set position in accordance with embodiments of the present disclosure.
Figure 17:
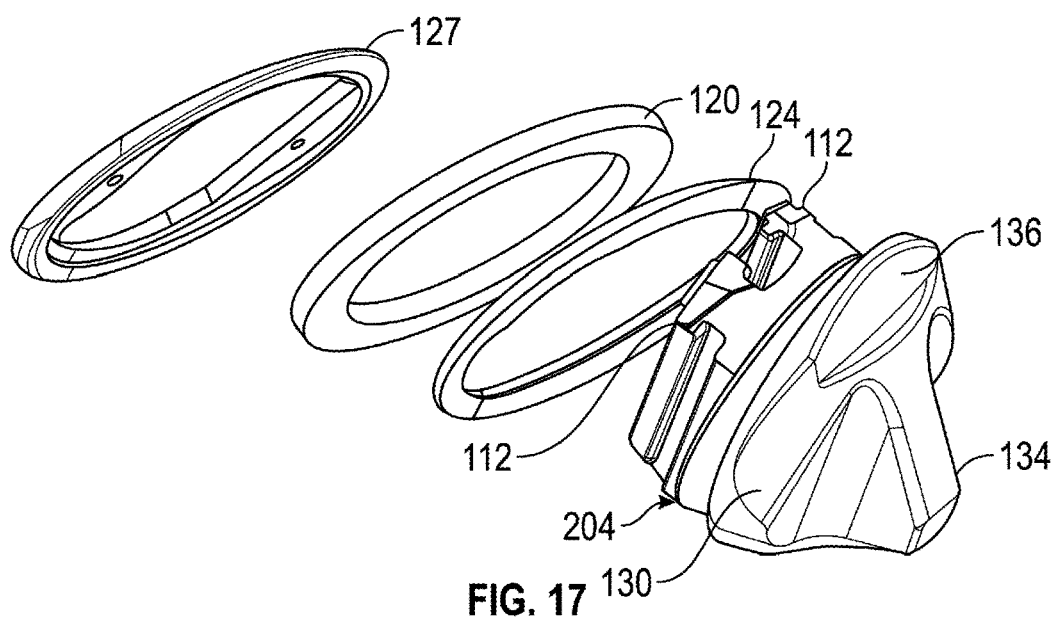
FIG. 17 is an exploded view of the single sealing head of FIG. 15 and FIG. 16 in accordance with embodiments of the present disclosure.

Referring to FIGS. 15-17, another embodiment of a pipe isolation device is shown, and is referred to as pipe isolation device 200. Pipe isolation device 200 includes the control bar head 102 and a single sealing head 204 slidably connected to the control bar head 102. Embodiments of pipe isolation device 200 are like pipe isolation device 100 but the pipe isolation device 200 has only one sealing head, referred to as the single sealing head 204. In some embodiments, the single sealing head 204 may be like the second sealing head 106 of the pipe isolation device 100 with the single sealing head 204 slidably connected to the control bar head 102. In other embodiments, the single sealing head 204 may be like the first sealing head 104 of the pipe isolation device 100 without the second sealing head 106. Like part numbers of embodiments of the pipe isolation devices 100, 200 are labeled with like reference numbers. Single sealing head 204 may slide relative to the control bar head 102 to position the pipe isolation device 200 between a first retracted position shown in FIG. 15 to a first set position shown in FIG. 16. Pipe isolation device 200 is in the fully retracted position when the first sealing head 204 is in the first retracted position and is in the fully set position when the first sealing head 204 is in the first set position.

Pipe isolation device 200 includes the first sliding engagement 108 for providing a slidable engagement connection between the control bar head 102 and the single sealing head 204, see FIG. 15. First sliding engagement 108 of the pipe isolation device 200 is configured to permit the single sealing head 204 to move along the first fixed path between the first retracted position and the first set position. First sliding engagement 108 for pipe isolation device 200 is configured as described and illustrated in FIG. 1 and FIG. 4 with respect to the pipe isolation device 100. For example, first sliding engagement 108 may be formed by a pair of first guide tracks 110, see FIG. 15, attached to a side of the control bar head 102 and the first guide members 112, see FIG. 17, attached to a first side of the single sealing head 204. Each of the first guide members 112 is interconnected with one of the first guide tracks 110, as shown in FIG. 4, to provide for sliding engagement between the control bar head 102 and the single sealing head 204. First guide tracks 110 extend along the control bar surface 117. Control bar surface 117 is at an acute angle with respect to a vertical axis 129 extending through a center of the control bar head 102. Pipe isolation device 200 may include different embodiments of the first sliding engagement 108 as previously discussed with respect to the pipe isolation device 100.

Referring to FIG. 17, an exploded view of an embodiment of the single sealing head 204 is shown. First seal element 120 is shown separated from the body of the single sealing head 204 to better illustrate the first seal element 104. When the first seal element 120 is attached to the body of the second sealing head 204, the first seal element 120 extends around the outer perimeter of the body of the single sealing head 204 to form a circumferential seal for sealing a pipe. First seal element 120 is disposed between the first nose ring 124 and the first retaining ring 127. First nose ring 124 and first backing ring 127 provide support to the first seal element 120. First retaining ring 127 and first nose ring 124 attach to the body of the single sealing head 204 and may have a shape that corresponds to the first seal element 120. Single sealing head 204 may also be an embodiment of the second sealing head 106 of the pipe isolation device 100 shown in FIGS. 1 and 2.

Pipe isolation device 200 includes the first locking mechanism 150 to lock the single sealing head 204 in the first retracted position, as described previously with respect to the first sealing head 104 and illustrated in FIG. 6 and FIG. 8.

In operation, the pipe isolation device 100 may be installed to double block the pipe 2, as shown in FIGS. 18-23. Pipe isolation device 100 is installed in the pipe 2 through a lateral access opening 4 through a sequence of operations to position the pipe isolation device 100 from the fully retracted position through the lateral access opening 4 to the fully set position in the pipe 2. Pipe isolation device 100 may be used in a method to isolate or block fluid pressure in a pipe 2. Pipe isolation device 100 is configured to traverse a right angle as the pipe isolation device 100 extends through the lateral access opening 4 and then moves the sealing heads 104, 106 of the pipe isolation device 100 forward in the pipe 2 to position the sealing heads 104, 106 in a concentric orientation with one another and with the pipe 2. Sealing heads 104, 106 form a cylindrical shape fitting within the internal diameter of the pipe 2 when in the fully set position. Pipe isolation device 100 forms multiple seals in the pipe 2 in the fully set position. Pipe isolation device 100 is configured with the first sliding engagement 108 to permit the first sealing head 104 to slide relative to the control bar head 102 along a first fixed path and traverse a right angle to gain access to an interior space 6 of the pipe 2, and the second sliding engagement 109 permitting the second sliding head 106 to slide relative to the first sealing head 104 along the second fixed path and traverse the right angle to gain access to the interior space 6 of the pipe 2.

Figure 18:
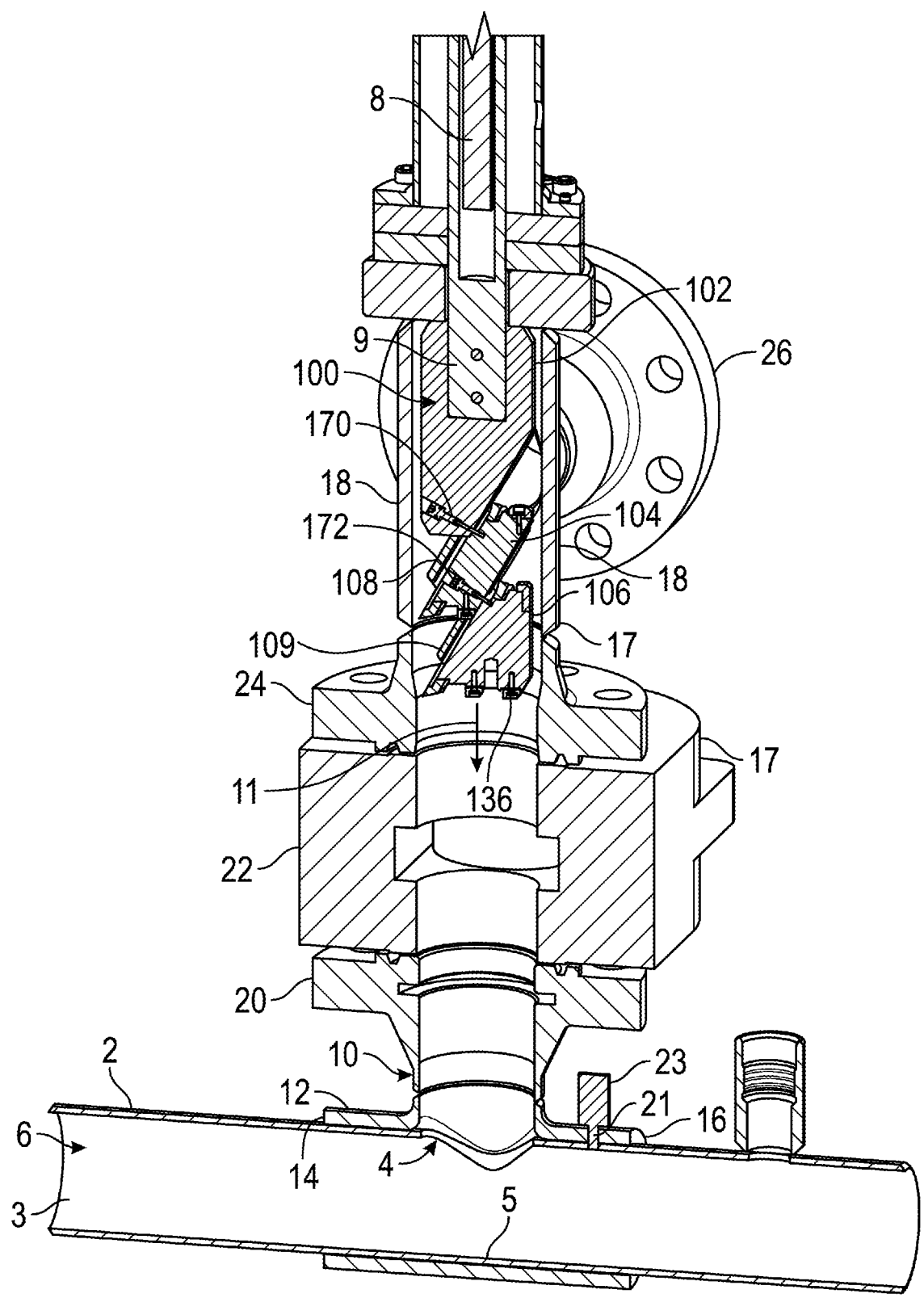
FIGS. 18-23 are a sequence of cross-sectional views showing the pipe isolation device being installed in the pipe and moving from the fully retracted position to the fully set position in the pipe in accordance with embodiments of the present disclosure.

Referring to FIG. 18, the pipe isolation device 100 is in a fully retracted position and disposed in a pipe branch 17 above the access opening 4 and a bottom pipe section 5 in the pipe 2. An actuator 8 is attached to the control bar head 102 of the pipe isolation device 100. The actuator 8 moves the control bar head 102 downwards in the pipe branch 17 to convey the pipe isolation device 100 into the lateral access opening 4 during the installation of the pipe isolation device 100. Actuator 8 may include an actuator control bar 9 detachably connected to the control bar head 102. An arrow 11 is shown in FIG. 18 to depict the downward movement of the actuator control bar 9 and connected pipe isolation device 100 through the pipe branch 17 and the access opening 4, and into the pipe 2.

Pipe branch 17 has a pipe fitting 10 with a pipe sleeve 12 that surrounds and extends outwardly from the access opening 4 to a first sleeve end 14 and a second sleeve end 16. Lateral access opening 4 may have a diameter equal to the internal diameter of the pipe 2, and the length from the vertical axis 129 through the center of the pipe branch 17 to each sleeve end 14, 16 may be equal to the internal diameter of the pipe 2, see FIG. 23. Pipe fitting 10 may be a full-encirclement pipe fitting that fits around the full circumference of the pipe 2. A first flange 20 connects the pipe fitting 10 and a valve 22. A second flange 24 connects the valve 22 and an isolation device housing 18. A third flange 26 connects to the isolation device housing and may be used for fluid flow from the pipe 2 that is temporarily blocked by the pipe isolation device 100. Bleed port 21 extends through the fitting sleeve 12 and the pipe 2 and is connected to a bleed joint 23.

Pipe isolation device 100, as shown in FIG. 18, is in the fully retracted position at an initial stage of the installation with the sealing heads 104, 106 in locked states to temporarily lock the sealing heads 104, 106. For example, first pin 170 and second pin 172 may be the locking mechanisms that lock the sealing heads 104, 106 in the locked states. Pins 170, 172 may be formed by shear pins that are un-sheared, as shown in FIG. 18 and FIG. 19, and have not been activated to release the sealing heads 104, 106 to the unlocked states.

Figure 19:
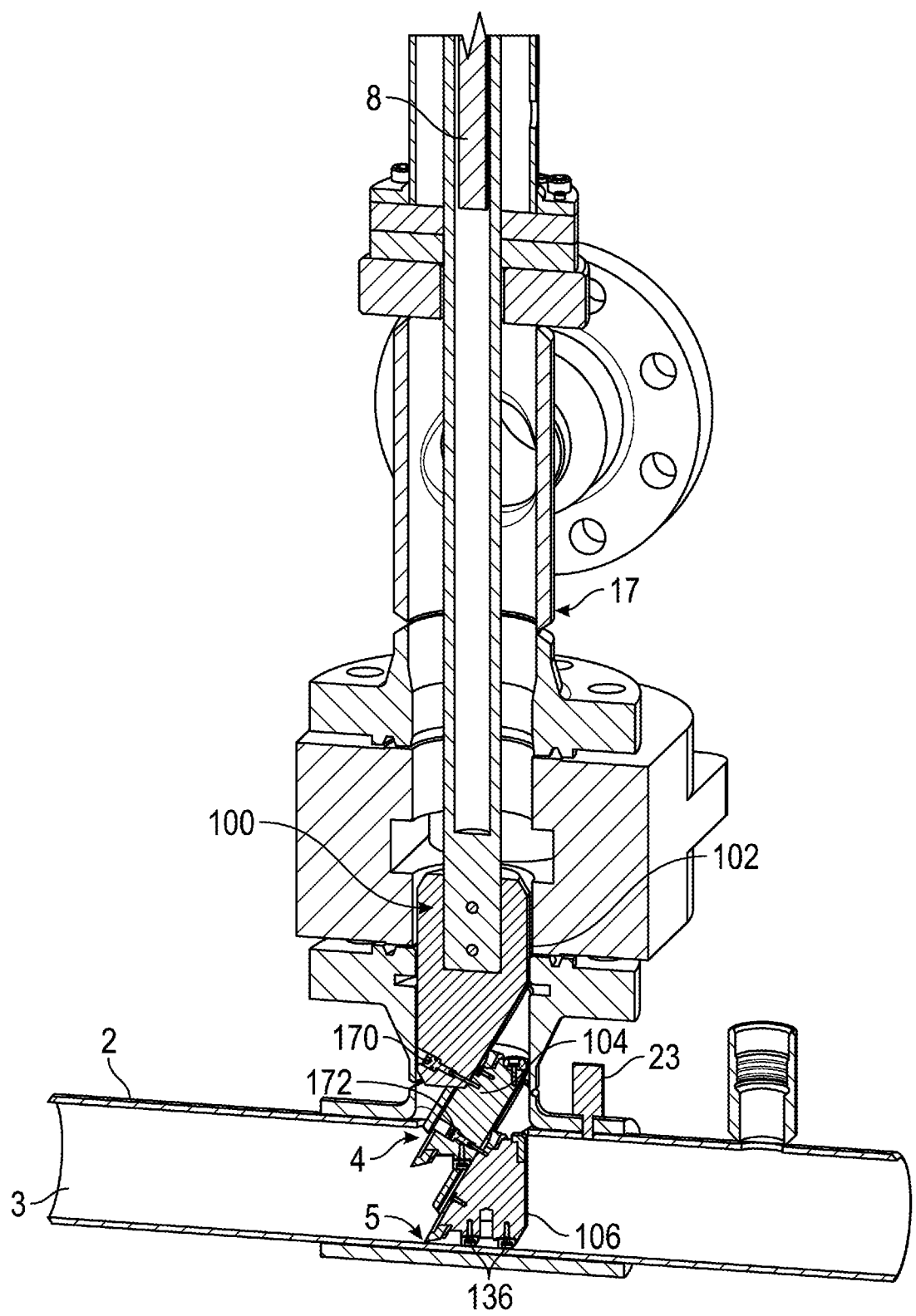

Referring to FIG. 18 and FIG. 19, the actuator 8 moves the control bar head 102 linearly downwards and along the vertical axis of the pipe branch 17 and through the pipe branch 17. As the control bar head 102 moves downwards, the pipe isolation device 100 is conveyed through the lateral access opening 4 where the second sealing head 106 engages the internal wall 3 at the pipe bottom section 5 of the pipe 2. Pipe isolation device 100 is in the fully retracted position with the sealing heads 104, 106 in the locked state as the pipe isolation device 100 moves through the pipe joint 17 and through the lateral access opening 4. Pipe isolation device 100 is maintained in the fully retracted position until the pipe isolation device 100 reaches the pipe bottom section 5 of the pipe 2. The locking mechanisms include the first locking mechanism located between the control bar head 102 and the first sealing head 104 and the second locking mechanism located between the first sealing head 104 and the second sealing head 106. Locking mechanisms may be formed by pins 170, 172.

Referring to FIG. 20, when the second sealing head 106 engages the internal wall 3 of the pipe 2 the downward force on the control bar head 102 provided by actuator 8 results in a first applied force being applied to the second sealing head 106. Second pin 172 formed by a shear pin shears in response to the first applied force. FIG. 19 shows a first portion of the second pin 172 in the first sealing head 104 and a second portion of the second pin 172 in the second sealing head 106 illustrating that the second pin 172 has sheared and the second sealing head 106 is in the unlocked state. The second locking mechanism, that may be formed by second pin 172, has been released to release the second sealing head 106 from the second retracted position at the pipe bottom section 5. When in the unlocked state, the second sealing head 106 is not biased in the second retracted position and is permitted to slide with respect to the first sealing head 104.

The first sealing head 104 remains in the first locked state to remain stationary with respect to the control bar 102 when the second sealing head 106 moves from the locked state to the unlocked state. Control bar head 102 and first sealing head 104 are stationary with respect to one another and continue to move downward, as depicted by arrow 13, through the lateral access opening 4 and towards the bottom of the pipe 2. As the control bar 102 and first sealing head 104 moves downwards together, the sealing heads 104, 106 slide with respect to each other and the second sealing head 106 slides forward in the pipe 2 away from the vertical axis of the control bar head and the pipe branch 17, as depicted by arrow 15. Second sealing head 106 moves forward and outwardly from the vertical axis of the pipe branch 17 in the pipe 2 with pads 136 sliding on the internal surface 3 of the pipe 2. Pads 136 help to center the second sealing head 106 in the pipe 2. As the second sealing head 106 moves forward, the sealing heads 104, 106 slide with respect to one another.

Figure 21:
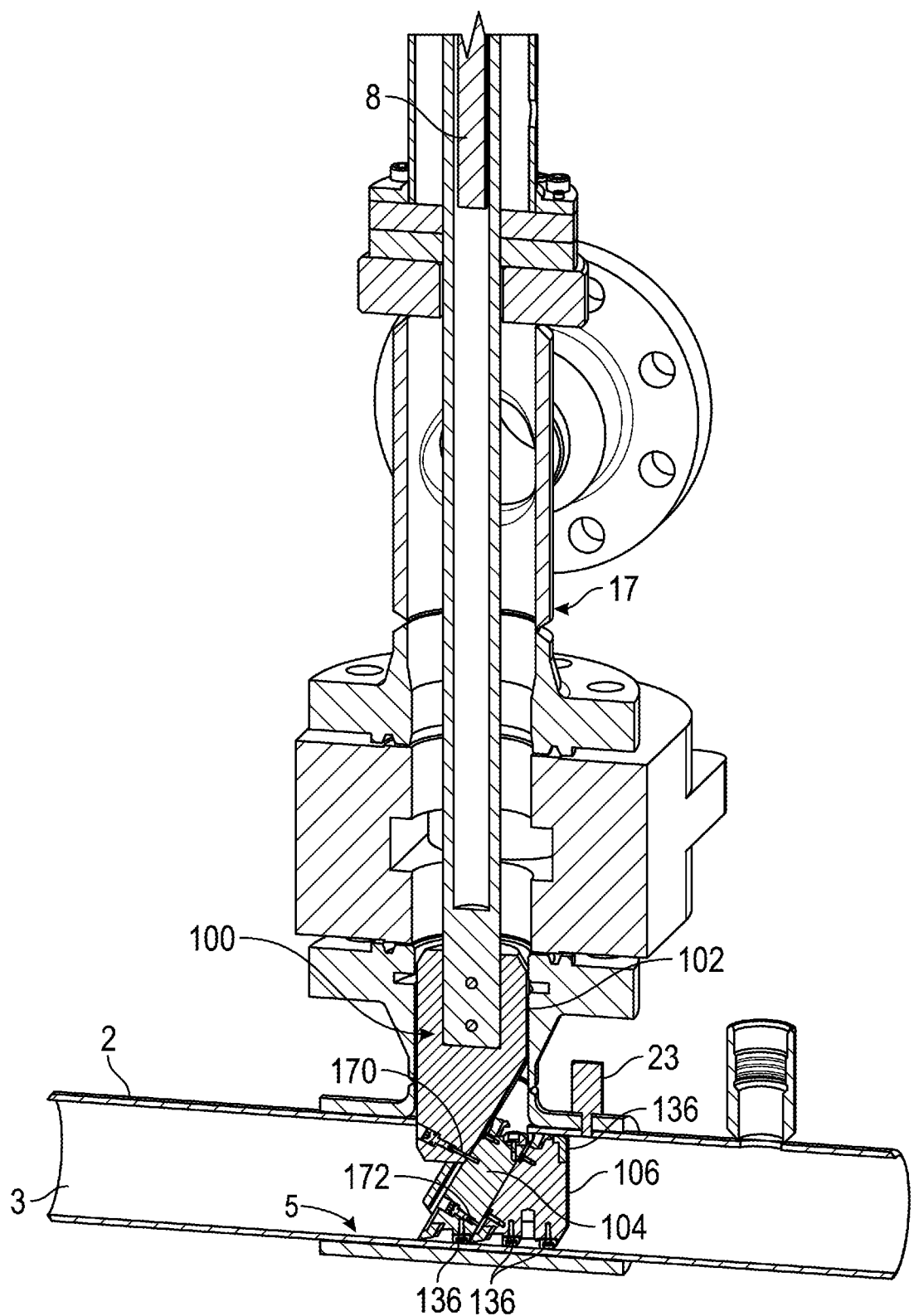

Referring to FIG. 21, as the control bar head 102 moves downwards, the first sealing head 104 engages an internal wall 3 at the pipe bottom section 5 of the pipe 2. First sealing head 104 is in the first retracted position and in the first locked state when the pad 136 on the bottom of the first sealing head 104 initially engages the internal wall 3 at the bottom of pipe 2 directly below the lateral access opening 4.

Figure 22:
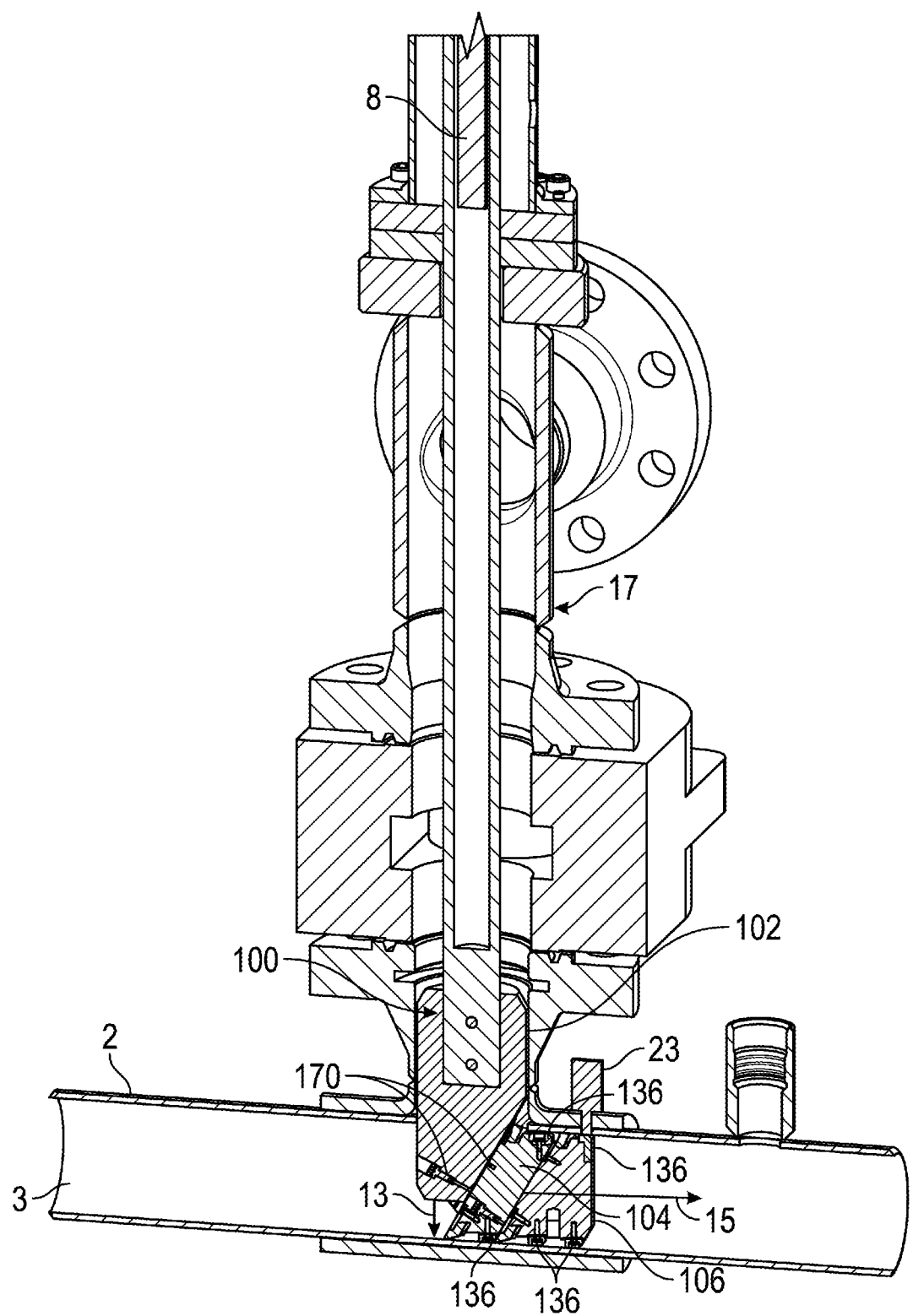

Referring to FIG. 22, when the first sealing head 104 engages the internal wall 3 of the pipe 2 the downward force on the control bar head 102 provided by actuator 8 results in a second applied force being applied to the first sealing head 104. First pin 170 formed by a shear pin shears in response to the second applied force. FIG. 22 shows a first portion of the first pin 170 in the control bar head 102 and a second portion of the first pin 170 in the first sealing head 104 to illustrate that the first pin 170 has sheared and the first sealing head 104 is in the unlocked state. When in the unlocked state, the first sealing head 104 is not biased in the first retracted position and is permitted to slide with respect to the control bar head 102.

Control bar head 102 continues to move downward, as depicted by arrow 13, through the lateral access opening 4 and towards the bottom of the pipe 2. As the control bar 102 moves downwards, the control bar head 102 and the first sealing head 104 slide with respect to each other and the sealing heads 104, 106 slide forward and outwardly in the pipe 2 away from the vertical axis of the control bar head 102 and the pipe branch 17, as depicted by arrow 15. As sealing heads 104, 106 move forward in the pipe 2, the pads 136 on the sealing heads 104, 106 slide on the internal surface 3 of the pipe 2. Pads 136 help to center the sealing heads 104, 106 in the pipe 2. As the sealing heads 104, 106 move forward, the control bar head 102 and the first sealing head 104 slide with respect to one another.

Figure 23:
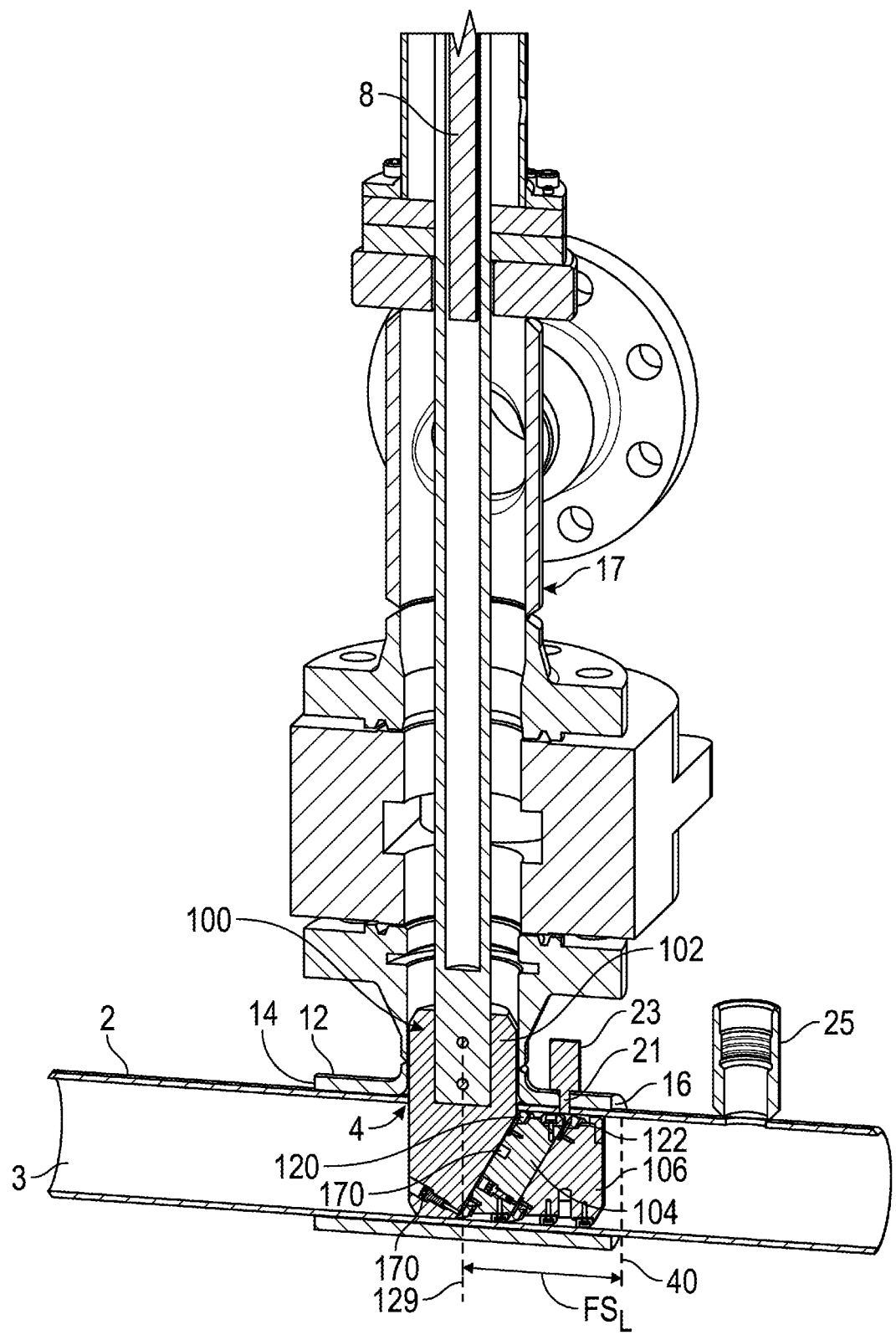

Referring to FIG. 23, as the control bar head 102 moves downwards, the control bar head 102 engages the internal wall 3 at the bottom of the pipe 2 directly below the lateral access opening 4. Pipe isolation device 100 is in the fully set position with the first sealing head 104 in the first set position and the second sealing head 106 in the second set position. First sealing head 104 forms a primary seal to fluid flowing in the pipe 2 and the second sealing head 106 forms a secondary seal if fluid leaks past the primary seal. Bleed port 21 extends through the fitting sleeve 12 and the pipe 2 to the isolated zone 32 located between the first seal element 120 and the second seal element 122, see FIG. 11.

Pipe isolation device 100 may be disposed within the bounds of the sleeve ends 14, 16 when positioned from the fully retracted position to the fully set position. As shown in FIG. 23, the sealing heads 104, 106 together have a cylindrical shape. Pipe isolation device 100, in some embodiments, is configured for a pipe having a lateral access opening 4 that has a diameter size approximately equal to the internal diameter of the pipe 2 being sealed, sometimes referred to as a size-on-size tap. A fitting sleeve length $FS_L$ may be measured from the vertical axis 129 extending through the center of the pipe branch 17 to the sleeve end, shown by sleeve vertical axis 40 in FIG. 23. In the embodiment shown in FIG. 23, the deployed length $L_D$, shown in FIG. 14, is less than the fitting sleeve length $FS_L$. In some embodiments, the deployed length $L_D$ may be greater than the $FS_L$.

In operation, the pipe isolation device 200 may be installed to single block the pipe 2. Pipe isolation device 200 operates in a manner like isolation device 100 but the pipe isolation device 200 blocks pipe 2 with only one sealing head, referred to as single sealing head 204, when installed in the pipe 2. In the first retracted position, pipe isolation device 200 may be disposed in a pipe branch 17 above the access opening 4 and a bottom pipe section 5 in the pipe 2. An actuator 8 may be attached to the control bar head 102 of the pipe isolation device 200. The actuator 8 moves the control bar head 102 downwards in the pipe branch 17 to convey the pipe isolation device 200 into the lateral access opening 4 during the installation of the pipe isolation device 200.

Actuator 8 may move the control bar head 102 linearly downwards and along the vertical axis of the pipe branch 17 and through the pipe branch 17. As the control bar head 102 moves downwards, the pipe isolation device 200 is conveyed through the lateral access opening 4 where the single sealing head 104 engages the internal wall 3 at the pipe bottom section 5 of the pipe 2. Pipe isolation device 200 is in the fully retracted position with the single sealing head 104 in the locked state as the pipe isolation device 200 moves through the pipe joint 17 and through the lateral access opening 4. Pipe isolation device 200 is maintained in the fully retracted position until the pipe isolation device 200 reaches the pipe bottom section 5 of the pipe 2. The locking mechanism may be located between the control bar head 102 and the single sealing head 204. The locking mechanism may be formed by the pin 170.

When the single sealing head 104 engages the internal wall 3 of the pipe 2 the downward force on the control bar head 102 provided by actuator 8 results in an applied force being applied to the single sealing head 106. First pin 170 formed by a shear pin shears in response to the applied force. The locking mechanism, that may be formed by the pin 170, is sheared to release the single sealing head 204 from the first retracted position at the pipe bottom section 5. When in the unlocked state, the single sealing head 204 is not biased in the first retracted position and is permitted to slide with respect to the control bar head 102.

As the control bar 102 moves downwards, the single sealing head 204 slides with respect to the control bar head 102 and slides forward in the pipe 2 away from the vertical axis of the control bar head and the pipe branch 17. More specifically, single sealing head 204 moves forward, or outwardly from the vertical axis of the pipe branch 17, in the pipe 2 with the pad 136 sliding on the internal surface 3 of the pipe 2. Pad 136 help to center the single sealing head 204 in the pipe 2. As the single sealing head 204 moves forward, the single sealing head 204 slides with respect to the control bar head 102.

As the control bar head 102 moves downwards, the control bar head 102 engages the internal wall 3 at the bottom of the pipe 2 directly below the lateral access opening 4. This results in the pipe isolation device 200 being positioned in the fully set position with the single sealing head 204 in the first set position. Single sealing head 104 forms a single, primary seal to fluid flowing in the pipe 2.

Pipe isolation device 200 may be disposed within the bounds of the sleeve ends 14, 16 when positioned from the fully retracted position to the fully set position. Single sealing head 204 has a cylindrical shape. Pipe isolation device 200, in some embodiments, is configured for a pipe having a lateral access opening 4 that has a diameter size approximately equal to the internal diameter of the pipe 2 being sealed, sometimes referred to as a size-on-size tap. A fitting sleeve length $FS_L$ may be measured from the vertical axis 129 extending through the center of the pipe branch 17 to the sleeve end, shown by sleeve vertical axis 40 in FIG. 23. In the embodiment shown in FIG. 23, the deployed length $L_D$ is less than the fitting sleeve length $FS_L$. In some embodiments, the deployed length $L_D$ may be greater than the $FS_L$.

Embodiments of the pipe isolation device are configured to translate the right angle at a lateral access opening and to provide a compact tool by providing sliding engagements to withstand the challenging environments of pipelines, including high pressures, high temperatures, and different types of fluids.

Although a few embodiments of the disclosure have been described in detail above, those of ordinary skill in the art will readily appreciate that many modifications are possible without materially departing from the teachings of this disclosure. For example, the pipe isolation device of the present disclosure may be modified by adding additional sealing heads to become a triple, or more, block and bleed apparatus. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A pipe isolation device, comprising:
   a control bar head having a first portion of a first sliding engagement;
   a first sealing head having a first seal element, a second portion of the first sliding engagement, and a first portion of a second sliding engagement, the first and second portions of the first sliding engagement permitting the first sealing head to slide relative to the control bar head along a first fixed path and traverse a right angle to gain access to an interior space of a pipe;
   a second sealing head having a second seal element and a second portion of the second sliding engagement, the first and the second portions of the second sliding engagement permitting the second sealing head to slide relative to the first sealing head along a second fixed path and traverse the right angle to gain access to the interior space of the pipe; and
   a locking mechanism configured to lock at least one of the first sealing head and the second sealing head in their respective retracted position and to unlock at least one of the first sealing head and the second sealing head in response to an applied force.

2. A pipe isolation device, comprising:
   a control bar head having a first portion of a first sliding engagement;
   a first sealing head having a first seal element, a second portion of the first sliding engagement, and a first portion of a second sliding engagement, the first and second portions of the first sliding engagement permitting the first sealing head to slide relative to the control bar head along a first fixed path from a first retracted position to a first set position to traverse a right angle to gain access to an interior space of a pipe;
   a second sealing head having a second seal element and a second portion of the second sliding engagement, the first and the second portions of the second sliding engagement permitting the second sealing head to slide relative to the first sealing head along a second fixed path from a second retracted position to a second set position to traverse the right angle to gain access to the interior space of the pipe; and
   a first locking mechanism having a first locked state configured to lock the first sealing head in the first retracted position and having a first unlocked state permitting the first sealing head to slide from the first retracted position to the first set position, and further comprising a second locking mechanism having a second locked state configured to lock the second sealing head in the second retracted position and having a second unlocked state permitting the second sealing head to slide from the second retracted position to the second set position.

3. The pipe isolation device of claim 2, wherein the second locking mechanism is biased in the second locked state and releases from the second locked state to the second unlocked state in response to a first applied force meeting a first force threshold, and wherein the first locking mecha-nism is biased in the first locked state and releases from the first locked state to the first unlocked state in response to a second applied force meeting a second force threshold.

4. The pipe isolation device of claim 3, wherein the first force threshold is less than the second force threshold.

5. The pipe isolation device of claim 3, wherein the second locking mechanism comprises a second pin or a second latch configured to release the second locking mechanism from the second locked state to the second unlocked state, and wherein the first locking mechanism comprises a first pin or a first latch configured to release the first locking mechanism from the first locked state to the first unlocked state.

6. A method of isolating a pipe, the method comprising:
   conveying a first sealing head and a second sealing head in a fully retracted position through a lateral access opening in the pipe, the first sealing head slidably connected to a control bar head and the second sealing head slidably connected to the first sealing head;
   sliding the first sealing head along a first sliding engagement and sliding the second sealing head along a second sliding engagement to a fully set position as the control bar head travels through the lateral access opening, wherein the first sealing head and the second sealing head each form a seal in the pipe in the fully set position;
   locking the first sealing head and the second sealing head in the fully retracted position with a locking mechanism in a locked state as the first sealing head and the second sealing head travel through the lateral access opening; and
   releasing the locking mechanism from the locked state to an unlocked state in response to an applied force as the control bar head is conveyed through the lateral access opening so as to permit the first sealing head and the second sealing head to move to the fully set position.

7. The method of claim 6, wherein locking the first sealing head and the second sealing head in the fully retracted position further comprises locking the first sealing head in a first retracted position in a first locked state with a first locking mechanism and locking the second sealing head in a second retracted position in a second locked state with a second locking mechanism.

8. The method of claim 7, wherein releasing the locking mechanism from the locked state to the unlocked state further comprises releasing the second locking mechanism from the second locked state to a second unlocked state in response to a first applied force, and releasing the first locking mechanism from the first locked state to a first unlocked state in response to a second applied force.

9. The method of claim 8, wherein the second sealing head engages an internal wall of the pipe as the second sealing head is conveyed through the lateral access opening so that the first applied force is applied to the second locking mechanism, and wherein the first sealing head engages the internal wall of the pipe as the first sealing head is conveyed through the lateral access opening so that the second applied force is applied to the first locking mechanism.

10. The method of claim 9, wherein the second sealing head is released to the second unlocked state before the first sealing head is released to the first unlocked state, the second locking mechanism is biased in the second locked state and releases from the second locked state to the second unlocked state in response to the first applied force meeting a first force threshold, and wherein the first locking mechanism is biased in the first locked state and releases from the first locked state to the first unlocked state in response to the second applied force meeting a second force threshold, and wherein the first force threshold is less than the second force threshold.

11. The method of claim 6, wherein the control bar head has a first portion of the first sliding engagement, the first sealing head has a first seal element and a second portion of the first sliding engagement permitting the first sealing head to slide relative to the control bar head along a first fixed path and traverse a right angle to gain access to an interior space of the pipe, and wherein the first sealing head has a first portion of the second sliding engagement and the second sealing head has a second seal element and a second portion of the second sliding engagement permitting the second sealing head to slide relative to the first sealing head along a second fixed path and traverse the right angle to gain access to the interior space of the pipe.

12. The method of claim 11, wherein the first sliding engagement comprises a first guide track and a first guide member slidably connected together, and wherein the second sliding engagement comprises a second guide track and a second guide member slidably connected together.

13. The method of claim 11, wherein the pipe has a pipe fitting with a fitting sleeve fitted around the lateral access opening and extending to a first sleeve end and a second sleeve end spaced from the lateral access opening, and wherein the first sealing element and the second sealing elements engage an internal wall of the pipe and are disposed between the first sleeve end and the second sleeve end.

* * * * *